(12) United States Patent
Kusafuka

(10) Patent No.: US 11,422,383 B2
(45) Date of Patent: Aug. 23, 2022

(54) THREE-DIMENSIONAL DISPLAY APPARATUS, THREE-DIMENSIONAL DISPLAY SYSTEM, MOBILE BODY, AND THREE-DIMENSIONAL DISPLAY METHOD

(71) Applicant: KYOCERA Corporation, Kyoto (JP)

(72) Inventor: Kaoru Kusafuka, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 262 days.

(21) Appl. No.: 16/627,665

(22) PCT Filed: Jul. 2, 2018

(86) PCT No.: PCT/JP2018/025068
§ 371 (c)(1),
(2) Date: Dec. 30, 2019

(87) PCT Pub. No.: WO2019/009243
PCT Pub. Date: Jan. 10, 2019

(65) Prior Publication Data
US 2020/0159015 A1  May 21, 2020

(30) Foreign Application Priority Data

Jul. 5, 2017 (JP) .............................. JP2017-132221

(51) Int. Cl.
*G02B 30/30* (2020.01)
*G02B 27/01* (2006.01)
(Continued)

(52) U.S. Cl.
CPC .............. *G02B 30/26* (2020.01); *B60K 35/00* (2013.01); *G02B 27/0101* (2013.01);
(Continued)

(58) Field of Classification Search
CPC ........ G02B 30/30; G02B 30/32; G02B 30/26; G02B 27/0101; G02B 2027/0118;
(Continued)

(56) References Cited

U.S. PATENT DOCUMENTS 9,047,711 B2  6/2015 Cho et al.
9,188,779 B2  11/2015 Sakai
(Continued)

FOREIGN PATENT DOCUMENTS

| CN | 103931179 A | 7/2014 |
| JP | 2007-078923 A | 3/2007 |
| JP | 2013-214008 A | 10/2013 |

*Primary Examiner* — Ryan D Howard
(74) *Attorney, Agent, or Firm* — Studebaker & Brackett PC

(57) ABSTRACT

A three-dimensional display apparatus includes a display surface, an optical element, and a controller. The display surface includes a plurality of subpixels arranged in a grid pattern along a first direction corresponding to a direction in which user's eyes are aligned and a second direction orthogonal to the first direction. The optical element defines a beam direction of light emitted by the display surface for each of a plurality of strip-shaped regions that extends in a direction on the display surface at a predetermined angle other than 0 degrees with respect to the second direction. The controller is configured to cause the display surface to display an image. The controller is configured to acquire brightness information and, based on the brightness information, reduce the luminance of at least a subset of binocular subpixels that have a portion included in a first visible region on the display surface for emitting light to a first eye position of a user and the remaining portion included in a second visible region on the display surface for emitting light to a second eye position of the user.

10 Claims, 16 Drawing Sheets

(51) Int. Cl.
*G02B 30/26* (2020.01)
*B60K 35/00* (2006.01)

(52) U.S. Cl.
CPC .............. *B60K 2370/1529* (2019.05); *G02B 2027/0118* (2013.01); *G02B 2027/0134* (2013.01)

(58) Field of Classification Search
CPC ........... G02B 2027/0134; H04N 13/31; H04N 13/317; H04N 13/125; B60K 35/00; B60K 2370/1529
See application file for complete search history.

(56) References Cited

U.S. PATENT DOCUMENTS

| | | |
|---|---|---|
| 2008/0117233 A1 | 5/2008 | Mather et al. |
| 2010/0265465 A1 | 10/2010 | Kubara et al. |
| 2013/0265646 A1 | 10/2013 | Sakai |
| 2014/0320614 A1 | 10/2014 | Gaudreau |
| 2016/0349507 A1 | 12/2016 | Hayashi |
| 2017/0109562 A1 | 4/2017 | Shroff et al. |
| 2018/0109778 A1* | 4/2018 | Wu .................... H04N 13/398 |

\* cited by examiner

FIG. 3
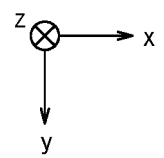
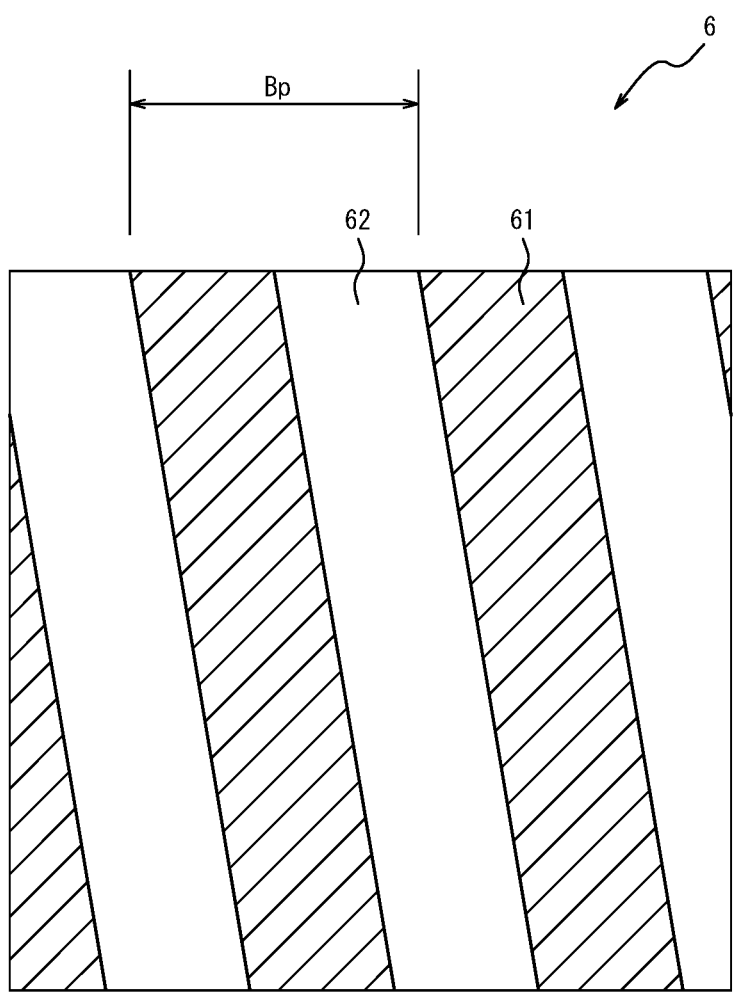

THREE-DIMENSIONAL DISPLAY APPARATUS, THREE-DIMENSIONAL DISPLAY SYSTEM, MOBILE BODY, AND THREE-DIMENSIONAL DISPLAY METHOD

CROSS REFERENCE TO RELATED APPLICATION

This application claims priority to and the benefit of Japanese Patent Application No. 2017-132221 filed on Jul. 5, 2017, the entire contents of which are incorporated herein by reference.

TECHNICAL FIELD

The present disclosure relates to a three-dimensional display apparatus, a three-dimensional display system, a mobile body, and a three-dimensional display method.

BACKGROUND

Conventionally, display apparatuses that display an image by causing light emitted from a display panel to reach a user's eyes are known (e.g., see PTL 1). Three-dimensional display apparatuses that display three-dimensional images without the need to wear eyeglasses are also known. Such three-dimensional display apparatuses include an optical element for causing a portion of light emitted from the display panel to reach a right eye and another portion of light emitted from the display panel to reach a left eye.

CITATION LIST

Patent Literature

PTL 1: JP-A-2013-214008

SUMMARY

A three-dimensional display apparatus according to the present disclosure includes a display surface, an optical element, and a controller. The display surface includes a plurality of subpixels arranged in a grid pattern along a first direction corresponding to a direction in which user's eyes are aligned and a second direction orthogonal to the first direction. The optical element defines a beam direction of light emitted from the display surface for each of a plurality of strip-shaped regions extending in a direction on the display surface at a predetermined angle other than 0 degrees with respect to the second direction. The controller is configured to cause the display surface to display an image. The controller is configured to acquire brightness information from the measuring apparatus. The controller is configured to, based on the brightness information, reduce the luminance of at least a set of binocular subpixels that have a portion included in a first visible region and a remaining portion included in a second visible region. The first visible region is a region of the display surface for emitting light which is to reach a first eye position of a user. The second visible region is a region of the display surface for emitting light which is to reach a second eye position of the user.

A three-dimensional display system according to the present disclosure includes a measuring apparatus and a three-dimensional apparatus. The measuring apparatus measures brightness. The three-dimensional display apparatus includes a display surface, an optical element, and a controller. The display surface includes a plurality of subpixels arranged in a grid pattern along a first direction corresponding to a direction in which user's eyes are aligned and a second direction orthogonal to the first direction. The optical element defines a beam direction of light emitted from the display surface for each of a plurality of strip-shaped regions extending in a direction on the display surface at a predetermined angle other than 0 degrees with respect to the second direction on the display surface. The controller is configured to cause the display surface to display an image. The controller is configured to acquire brightness information from the measuring apparatus. The controller is configured to, based on the brightness information, reduce the luminance of at least a subset of binocular subpixels that have a portion included in a first visible region and a remaining portion included in a second visible region. The first visible region is a region of the display surface for emitting light which is to reach a first eye position of a user. The second visible region is a region of the display surface for emitting light which is to reach a second eye position of the user.

A mobile body according to the present disclosure includes a three-dimensional display system. The three-dimensional display system includes a measuring apparatus and a three-dimensional display apparatus. The measuring apparatus measures brightness. The three-dimensional display apparatus includes a display surface, an optical element, and a controller. The display surface includes a plurality of subpixels arranged in a grid pattern along a first direction corresponding to a direction in which user's eyes are aligned and a second direction orthogonal to the first direction. The optical element defines a beam direction of light emitted from the display surface for each of a plurality of strip-shaped regions extending in a direction on the display surface at a predetermined angle other than 0 degrees with respect to the second direction on the display surface. The controller is configured to cause the display surface to display an image. The controller is configured to acquire brightness information from the measuring apparatus. The controller is configured to, based on the brightness information, reduce the luminance of at least a subset of binocular subpixels that have a portion included in a first visible region and a remaining portion included in a second visible region. The first visible region is a region of the display surface for emitting light which is to reach a first eye position of a user. The second visible region is a region of the display surface for emitting light which is to reach a second eye position of the user.

A display method according to the present disclosure is a three-dimensional display method performed by a three-dimensional display apparatus. The three-dimensional display apparatus includes a display surface, an optical element, and a controller. The display surface includes a plurality of subpixels arranged in a grid pattern along a first direction corresponding to a direction in which user's eyes are aligned and a second direction orthogonal to the first direction. The optical element defines a beam direction of light emitted from the display surface for each of a plurality of strip-shaped regions extending in a direction on the display surface at a predetermined angle other than 0 degrees with respect to the second direction on the display surface. The controller is configured to cause the display surface to display an image. The controller is configured to acquire brightness information from the measuring apparatus. The controller is configured to, based on the brightness information, reduce the luminance of at least a subset of binocular subpixels that have a portion included in a first visible region and a remaining portion included in a second visible region. The first visible region is a region of the display surface for emitting light which is to reach a first eye position of a user. The second visible region is a region of the display surface for emitting light which is to reach a second eye position of the user.

BRIEF DESCRIPTION OF THE DRAWINGS

In the accompanying drawings:

FIG. 3 is a diagram illustrating an example in which an optical element illustrated in FIG. 1 is viewed in the depth direction;

DETAILED DESCRIPTION

The present disclosure provides a three-dimensional display apparatus, a three-dimensional display system, a mobile body, and a three-dimensional display method that are capable of displaying a three-dimensional image that can be appropriately seen by a user.

First Embodiment

Hereinafter, a first embodiment of the present disclosure will be described with reference to the accompanying drawings.

Figure 1:
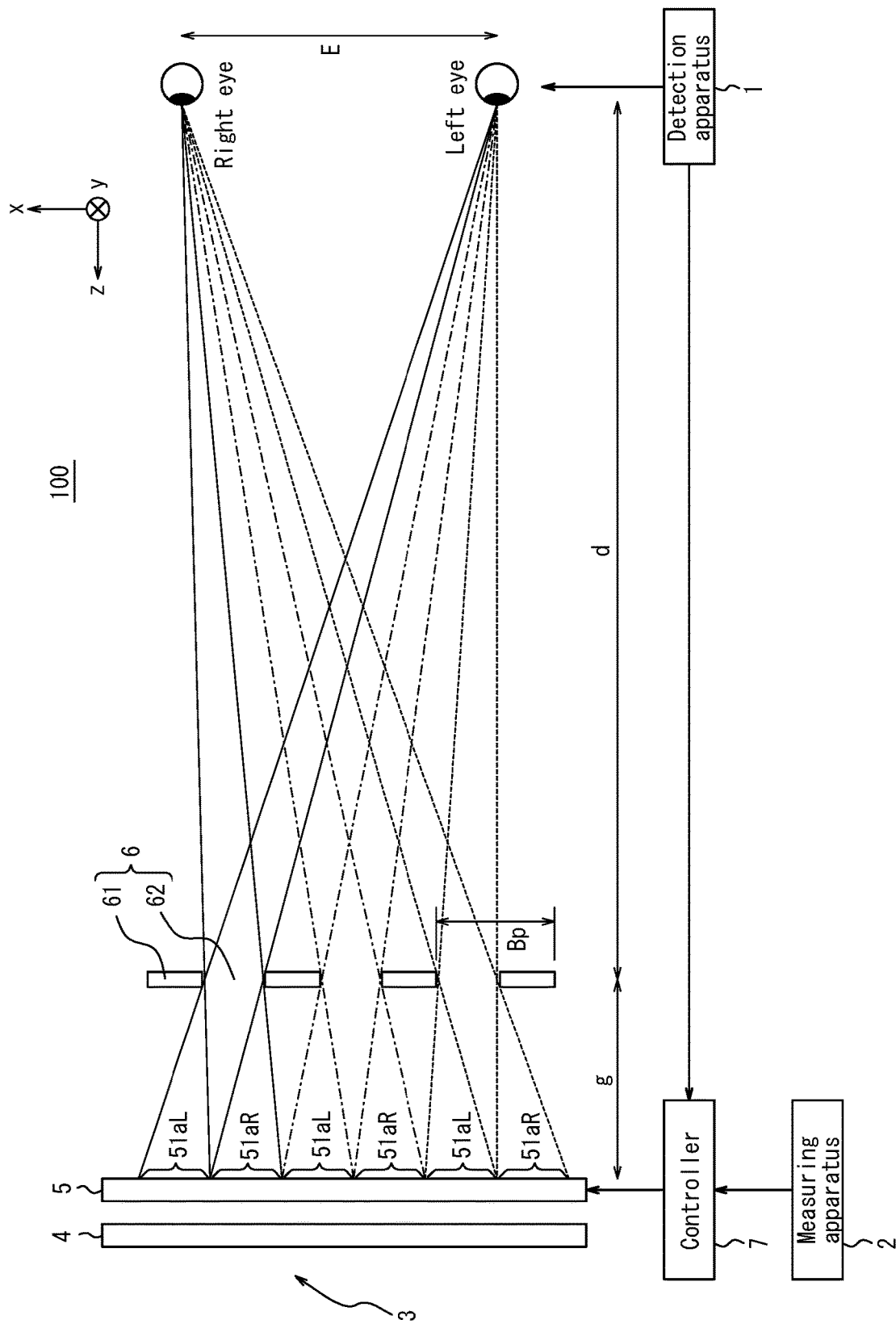
FIG. 1 is a diagram illustrating an example of a three-dimensional display system according to a first embodiment viewed in the vertical direction.

A three-dimensional display system 100 according to a first embodiment of the present disclosure includes a detection apparatus 1, a measuring apparatus 2, and a three-dimensional display apparatus 3, as illustrated in FIG. 1.

The detection apparatus 1 detects a position of a left eye (a first eye) and a right eye (a second eye) of a user and outputs the positions to the controller 7. The detection apparatus 1 may include, for example, a camera. The detection apparatus 1 may capture an image of the user's face using the camera. The detection apparatus 1 may detect a position of the left eye and the right eye of the user based on an image captured by the camera that includes an image of the user's face. The detection apparatus 1 may detect the positions of the left eye and the right eye of the user as coordinates in a three-dimensional space based on an image captured by one camera. The detection apparatus 1 may detect the positions of the left eye and the right eye of the user as coordinates in a three-dimensional space based on images captured by two or more cameras.

The detection apparatus 1 does not need to include a camera and can be connected to an external camera. The detection apparatus 1 may include an input terminal for receiving a signal input from the external camera. The external camera may be directly connected to the input terminal. The external camera may be indirectly connected to the input terminal via a common network. The detection apparatus 1 which does not include a camera may include an input terminal through which the camera inputs an image signal. The detection apparatus 1 which does not include a camera may detect the positions of the left eye and the right eye of the user based on the image signal input to the input terminal.

The detection apparatus 1 may include, for example, a sensor. The sensor may be an ultrasonic sensor, an optical sensor, or the like. The detection apparatus 1 may detect a position of the users head using the sensor and detect the left eye and the right eye of the user based on the position of the head. The detection apparatus 1 may detect the positions of the left eye and the right eye of the user as coordinates in a three-dimensional space using one or more sensors.

The three-dimensional display system 100 does not need to include the detection apparatus 1. When the three-dimensional display system 100 does not include the detection apparatus 1, the three-dimensional display apparatus 3 may include an input terminal for receiving a signal input from an external detection apparatus. The external detection apparatus may be connected to the input terminal. The external detection apparatus may use an electrical signal or an optical signal as a transmission signal to be transmitted to the input terminal. The external detection apparatus may be indirectly connected to the input terminal via a common network. The controller 7 may receive, as an input, position coordinates indicating the positions of the left eye and the right eye of the user acquired from the external detection apparatus. The controller 7 may calculate a displacement distance of the left eye and the right eye along the horizontal direction based on the position coordinates.

The measuring apparatus 2 can measure an illuminance of the surrounding environment. The measuring apparatus 2 outputs illuminance information indicating the measured illuminance to the three-dimensional display apparatus 3. The measuring apparatus 2 may be configured as an illuminance sensor. The illuminance sensor may measure the illuminance of the surrounding environment. The illuminance sensor may include a photodetector such as a photocell, a phototube, a photomultiplier tube, or the like. The illuminance sensor may measure the illuminance of the surrounding environment by converting light incident on the photodetector into an electrical signal.

The measuring apparatus 2 may be an apparatus for measuring the illuminance of the surrounding environment for the purpose of controlling another apparatus. The measuring apparatus 2 may be configured as, for example, automatic-lighting headlights.

As illustrated in FIG. 1, the three-dimensional display apparatus 3 includes an emitter 4, a display panel 5, a parallax barrier 6 serving as an optical element, and a controller 7.

The emitter 4 irradiates the surface of the display panel 5. The emitter 4 may include a light source, a light guide plate, a diffusion plate, a diffusion sheet, and the like. In the emitter 4, the light source emits light which is homogenized in a direction of the surface of the display panel 5 by the light guide plate, the diffusion plate, the diffusion sheet, and the like. The emitter 4 emits the homogenized light towards the display panel 5.

Figure 2:
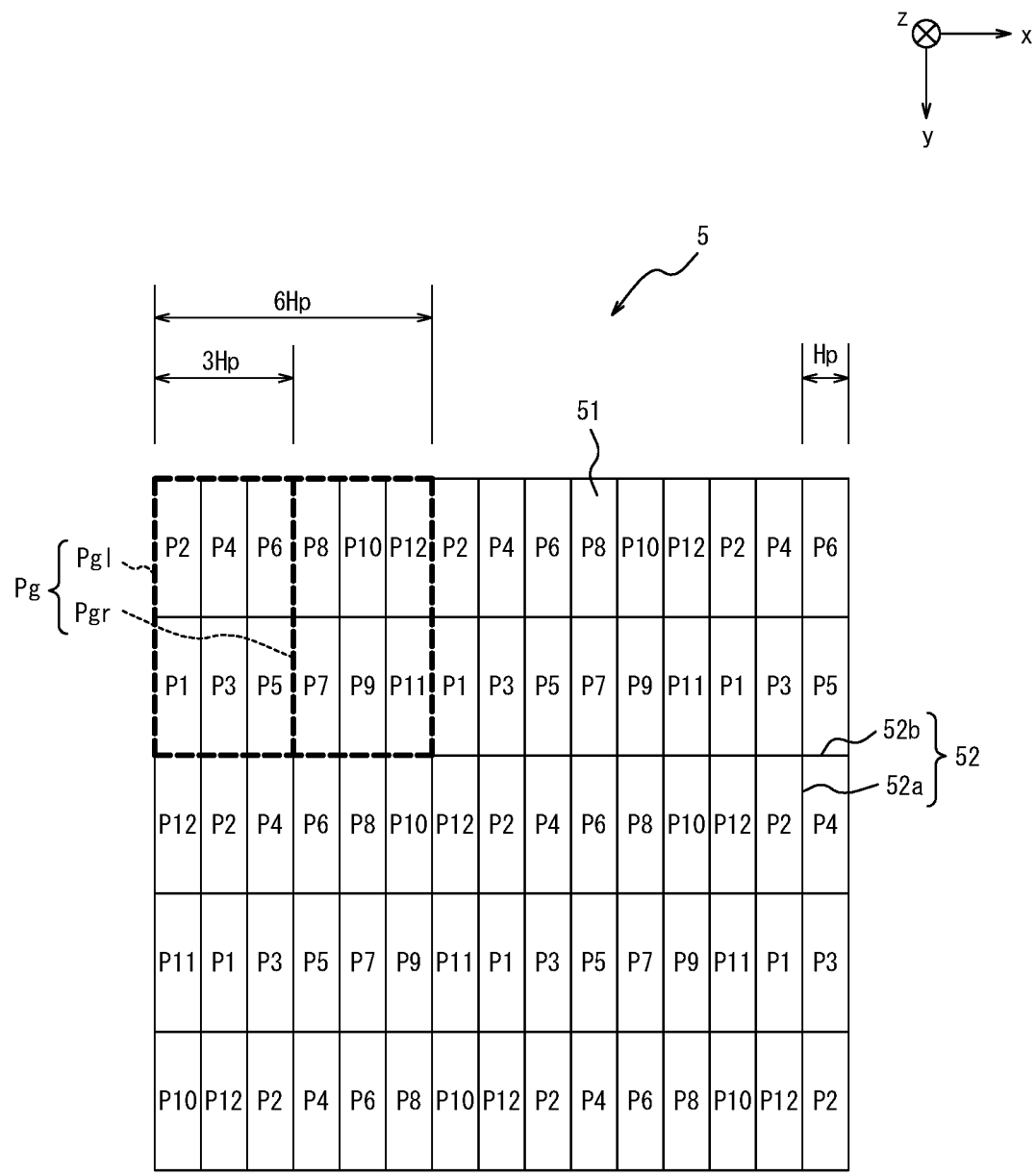
FIG. 2 is a diagram illustrating an example in which a display panel illustrated in FIG. 1 is viewed in the depth direction.

The display panel 5 may be configured as a display panel such as, for example, a transmitting liquid crystal panel. The display panel 5 includes a display surface 51 that has a plate-like shape and a plurality of subdivisions divided into a grid pattern along the first direction and the second direction orthogonal to the first direction by the black matrix 52, as illustrated in FIG. 2. A direction orthogonal to the first direction and the second direction will be referred to as a third direction. The first direction may be referred to as a horizontal direction. The second direction may be referred to as a vertical direction. The third direction may be referred to as a depth direction. However, the first direction, the second direction, and the third direction are not limited thereto. In the drawings, the first direction is represented by an x-axis direction, the second direction is represented by a y-axis direction, and the third direction is represented by a z-axis direction.

The black matrix 52 includes a first black line 52a that extends in the vertical direction and a second black line 52b that extends in the horizontal direction. For example, a plurality of first black lines 52a are arranged in the horizontal direction at a constant pitch. For example, a plurality of second black lines 52b are arranged in the vertical direction at a constant pitch.

Each of the subdivisions corresponds to one subpixel. Thus, the display surface 51 includes a plurality of subpixels arranged in a grid pattern along the horizontal direction and the vertical direction.

Each of the subpixels corresponds to one of the colors R (Red), G (Green), and B (Blue). One pixel may be configured as a combination of three subpixels respectively corresponding to R, G, and B. One pixel may be referred to as one image element. The horizontal direction corresponds to, for example, a direction in which a plurality of subpixels constituting one pixel are arranged. The vertical direction corresponds to, for example, a direction in which subpixels corresponding to the same color are arranged. The display panel 5 is not limited to a transmitting liquid crystal panel and may be another type of a display panel such as an organic EL display panel. When the display panel 5 is a self-luminous display panel, the three-dimensional display apparatus 3 may omit the emitter 4.

A plurality of sub-pixels arranged in the display surface 51 as described above constitute a subpixel group Pg. The subpixel group Pg includes a left eye subpixel group Pgl (a first subpixel group) and a right eye subpixel group Pgr (a second sub-pixel group). The left eye subpixel group Pgl and the right eye subpixel group Pgr are arranged adjacent to each other in the horizontal direction. A plurality of subpixel groups Pg are repeatedly arranged adjacent to one another in the horizontal direction. The sub-pixel group Pg is repeatedly arranged in the vertical direction in such a manner as to be adjacent to a position displaced by one subpixel in the horizontal direction.

The left eye subpixel group Pgl includes subpixels arranged in a predetermined number of columns and a predetermined number of rows. In particular, the left eye subpixel group Pgl includes sequentially arranged (n×b)-number of subpixels P1 to Pm (hereinafter, n×b=m) constituted of b-number (b-rows) of subpixels in the vertical direction and n-number (n-columns) of subpixels in the horizontal direction. The right eye subpixel group Pgr includes subpixels arranged in a predetermined number of rows and a predetermined number of columns, in a manner similar to the left eye subpixel group Pgl. In particular, the right eye subpixel group Pgr includes sequentially arranged m-number of subpixels P(m+1) to Pm (2×m) constituted of m-number of subpixels in the horizontal direction and b-number of subpixels in the vertical direction. Hereinafter, n may be referred to as a horizontal arrangement number. Also, b may be referred to as a vertical arrangement number.

In the example illustrated in FIG. 2, the display surface 51 includes the left eye subpixel group Pgl constituted of six subpixels P1 to P6 in which two subpixels are sequentially arranged in the vertical direction and three subpixels are sequentially arranged in the horizontal direction. The display surface 51 includes the right eye subpixel group Pgr constituted of six subpixels P7 to P12 in which two subpixels are sequentially arranged in the vertical direction and three subpixels are sequentially arranged in the horizontal direction. The right eye subpixel group Pgr is adjacent to the left eye subpixel group Pgl in the horizontal direction.

The parallax barrier 6 is formed by a plane extending along the display surface 51 and arranged at a position spaced apart from the display surface 51 by a predetermined gap g, as illustrated in FIG. 1. The parallax barrier 6 may be located on the opposite side from the emitter 4 with respect to the display panel 5. The parallax barrier 6 may be located on the same side as the emitter 4 with respect to the display panel 5.

The parallax barrier 6 defines a beam direction as a propagation direction of image light emitted from each of the subpixels for each of transmitting regions 62 formed as a plurality of strip-shaped regions extending in a predetermined direction in the surface, as illustrated in FIG. 3. The predetermined direction has a predetermined angle, other than 0 degrees, with respect to the vertical direction. Image light emitted from the subpixels and defined by the parallax barrier 6 determines a region of the display surface 51 visible to the user's eyes. Hereinafter, this region will be referred to as a visible region 51a. A region of the display surface 51 visible to the user's left eye will be referred to as a left eye visible region 51aL (a first visible region). A region of the display surface 51 visible to the user's right eye will be referred to as a right eye visible region 51aR (a second visible region).

In particular, the parallax barrier 6 includes a plurality of light shielding surfaces 61 for blocking image light. The plurality of light shielding surfaces 61 define the transmitting regions 62 between the respective adjacent light shielding surfaces 61. The transmitting regions 62 have a higher light transmittance than the light shielding surfaces 61. The light shielding surfaces 61 have a lower light transmittance than the transmitting regions 62.

The transmitting regions 62 are portions for transmitting light incident on the parallax barrier 6. The transmitting regions 62 may transmit light at a transmittance of a first predetermined value or more. The first predetermined value may be, for example, 100% or a value close thereto. The light shielding surfaces 61 are portions for blocking the light incident on the parallax barrier 6. In other words, the light shielding surfaces 61 block the image displayed on the three-dimensional display apparatus 3. The light shielding surfaces 61 may block light at a transmittance of a second predetermined value or less. The second predetermined value may be, for example, 0% or a value close thereto.

The transmitting regions 62 and the light shielding surfaces 61 extend in a predetermined direction which follows the display surface 51 and are alternately arranged in a repeating manner in the direction orthogonal to the predetermined direction. The transmitting regions 62 define the respective beam directions of image light emitted from the subpixels.

In a case in which a line indicating an edge of the transmitting region 62 extends in the second direction, a moiré pattern may occur between an aperture pattern of the parallax barrier 6 and a pixel pattern displayed on the display panel 5. When the line indicating the edge of the transmitting region 62 extends in a predetermined direction at a predetermined angle other than 0 degrees with respect to the second direction, the moiré pattern that occurs in a displayed image can be reduced.

A barrier pitch Bp corresponding to an arrangement interval of the light transmitting regions 62 of the parallax barrier 6 and the gap g between the display surface 51 and the parallax barrier 6 are defined to satisfy the equations (1) and (2) described below. In the equations (1) and (2), d represents a preferred viewing distance. The preferred viewing distance d is the distance between the user's eyes and the parallax barrier 6 in which a horizontal length of the visible region 51a corresponds to the n-number of subpixels. E is the distance between the eyes of the user. Hp is the horizontal length of a subpixel.

$$E : d = (n \times Hp) : g \qquad \text{Equation (1)}$$

$$d : Bp = (d+g) : (2 \times n \times Hp) \qquad \text{Equation (2)}$$

The parallax barrier 6 may be configured as a film or a plate-like member having a transmittance lower than the second predetermined value. In this case, the light shielding surfaces 61 are configured as the film or the plate-like member. The transmitting regions 62 are configured as openings formed in the film or the plate-like member. The film may be made of a resin or any appropriate material. The plate-like member may be made of a resin, a metal, or any appropriate material. The parallax barrier 6 is not limited to being configured as the film or the plate-like member and may be configured as a different type of member. The parallax barrier 6 may include a substrate having a light-shielding property or a light-shielding additive added thereto.

The parallax barrier 6 may be configured as a liquid crystal shutter. The liquid crystal shutter can control light transmittance in accordance with an applied voltage. The liquid crystal shutter may include a plurality of pixels and control the light transmittance of each of the pixels. The liquid crystal shutter may include a high light-transmittance region or a low light-transmittance region formed in any appropriate shape. In a case in which the parallax barrier 6 is configured as a liquid crystal shutter, the transmitting regions 62 may be areas having a light transmittance of the first predetermined value or more. In a case in which the parallax bather 6 is configured as a liquid crystal shutter, the light shielding surfaces 61 may be areas having a light transmittance of the second predetermined value or less.

When the parallax barrier 6 has the above configuration, the parallax barrier 6 causes image light emitted from some subpixels in the display surface 51 to pass through the transmitting regions 62 and reach the user's right eye. The parallax barrier 6 causes image light emitted from other subpixels to pass through the transmitting regions 62 and reach the user's left eye.

An image seen by the user's eyes by image light propagated to the user's left eye and image light propagated to right eye will be described in detail with reference to FIG. 4. The parallax barrier 6 is omitted in FIG. 4.

Figure 4:
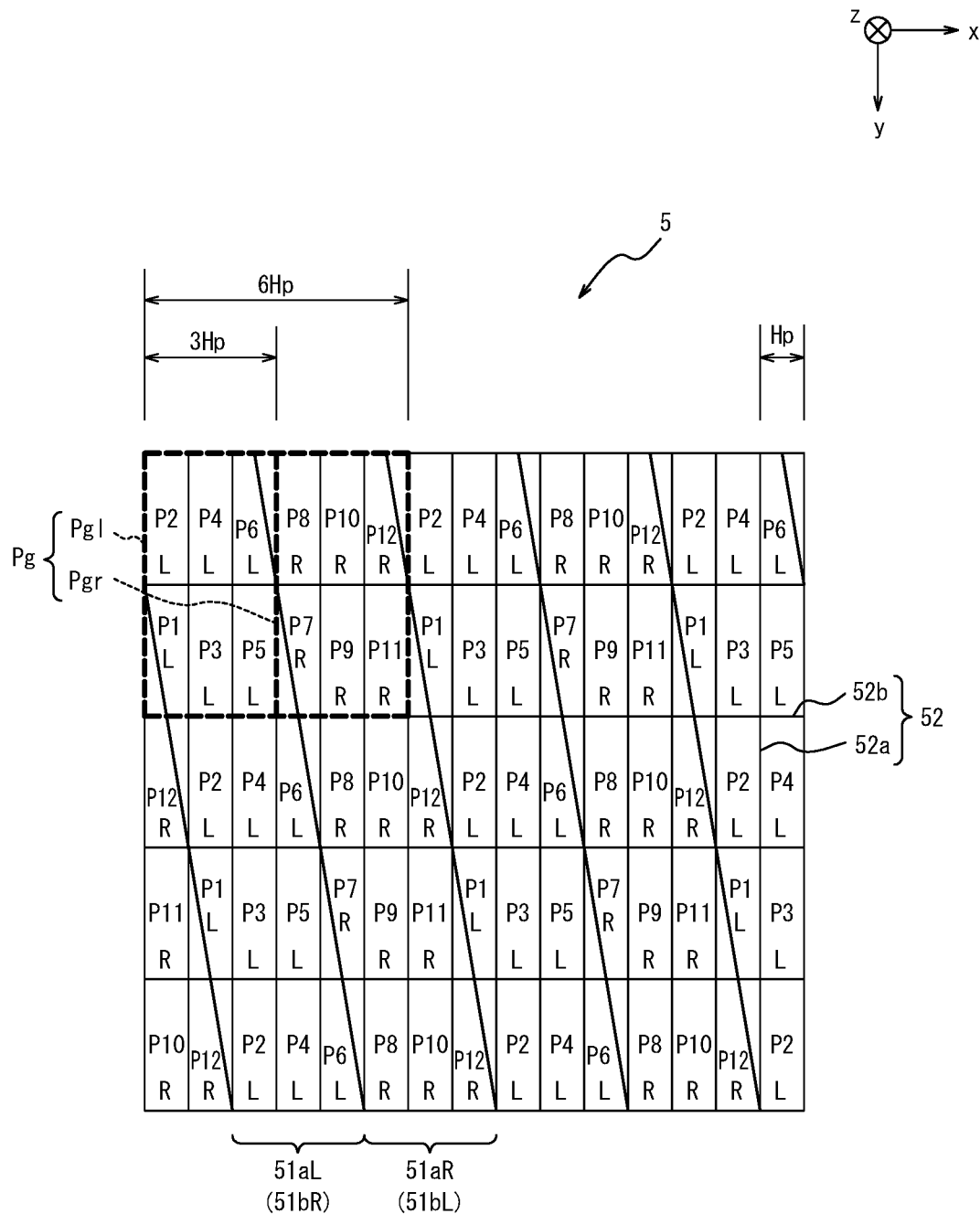
FIG. 4 is a schematic diagram for explaining an example image displayed by a display surface when user's eyes are located at a reference position and an illuminance of a surrounding environment is equal to or greater than a first threshold.

As described above, the left eye visible region 51aL illustrated in FIG. 4 is a region of the display surface 51 seen by the user's left eye when image light is transmitted through the transmitting regions 62 and reaches the user's left eye. A left eye invisible region 51bL is a region which cannot be seen by the user's left eye due to image light being blocked by the shielding surface 61 of the parallax barrier 6. Thus, for example, when a left eye image is displayed in the subpixels included in the left eye visible region 51aL and a right eye image is displayed in the left eye invisible region 51bL, the user's left eye sees the left eye image. Each of the subpixels for displaying the left eye image is denoted by a reference sign "L" in the drawings.

The right eye visible region 51aR is a region of the display surface 51 seen by the user's right eye when image light emitted from other subpixels is transmitted through the transmitting region 62 of the parallax barrier 6 and reaches the user's right eye. The right eye invisible region 51bR is a region which cannot be seen by the user's right eye due to image light being blocked by the shielding surface 61 of the parallax barrier 6. Thus, for example, when the right eye image (a second image) is displayed in the subpixels included in the right eye visible region 51aR and the left eye image (a first image) is displayed in the right eye invisible region 51bR, the user's right eye sees the right eye image. Each of the subpixels for displaying the right eye image is denoted by a reference sign "R" in the drawings.

The aperture ratio of the parallax barrier 6, corresponding to a horizontal direction length of the transmitting region 62 with respect to the barrier pitch Bp, is 50% in the example illustrated in FIG. 3. In this case, the right eye visible region 51aR can correspond to the left eye invisible region 51bL.

Also, the right eye invisible region 51bR can correspond to the left eye visible region 51aL.

As described above, the user's right eye can see the right eye image and the user's left eye can see the left eye image. Thus, when there is a parallax between the left eye image and the right eye image, the user can see a three-dimensional image. However, the light transmitting regions 62 of the parallax barrier 6 according to the present embodiment extend in a direction at the predetermined angle other than 0 degrees with respect to the vertical direction. The subpixels are arranged in the grid pattern in the horizontal direction and the vertical direction. Thus, some subpixels out of the subpixels on the display surface 51 (e.g., the subpixels P1, P6, P7, and P12 illustrated in FIG. 4) are binocular subpixels. A binocular subpixel is a subpixel that includes a portion included in the left eye visible region 51aL and the remaining portion included in the right eye visible region 51aR. A portion of the binocular subpixel is seen by the left eye, and the remaining portion of the binocular subpixel is seen by the right eye. As a result, cross-talk occurs to the user's eyes.

Accordingly, the controller 7 can cause each of the subpixels to display an image in such a manner as to reduce crosstalk caused by the binocular subpixels.

The controller 7 is connected to and controls each constituent element of the three-dimensional display system 100. The constituent elements controlled by the controller 7 include the detection apparatus 1 and the display panel 5. The controller 7 is configured as, for example, a processor. The controller 7 may include one or more processors. The processor may include a general-purpose processor for reading a particular program and performing a particular function, or a specialized processor dedicated for a particular processing. The specialized processor may include an application-specific integrated circuit (ASIC: Application Specific Integrated Circuit). The processor may include a programmable logic device (PLD: Programmable Logic Device). The PLD may include an FPGA (Field-Programmable Gate Array). The controller 7 may be configured as a SoC (System-on-a-Chip) or a SiP (System In a Package) in which one or more processors cooperate. The controller 7 may include a memory which stores various information and programs for operating each constituent element of the three-dimensional display system 100. The memory may be configured as, for example, a semiconductor memory. The memory may function as a working memory of the controller 7.

The controller 7 acquires information indicating a position of the user's eyes and brightness information, and causes each of the plurality of subpixels on the display surface 51 to display an image based on the position and the brightness.

In particular, the controller 7 can acquire information indicating the position of the user's eyes detected by the detection apparatus 1. The controller 7 can acquire the brightness information indicating brightness measured by the measuring apparatus 2. The brightness information may be, for example, an illuminance of the surrounding environment.

The following is a description of an image displayed by each of the subpixels caused by the controller 7 based on the position and the illuminance.

First Example

An example in which the controller 7 causes each of the subpixels to display an image when the user's eyes are located at a reference position will be described in detail as a first example, with reference to FIG. 4 to FIG. 6.

The reference position is a position of the user's eyes at which a straight line (an oblique line illustrated in FIG. 4) constituting the boundary between the left eye visible region 51aL and the right eye visible region 51aR passes through the intersection between the first black line 52a and the second black line 52b at predetermined intervals, as illustrated in FIG. 4.

The controller 7 can determine the left eye subpixel group Pgl based on the position of the user's eyes. In particular, the controller 7 can determine the left eye visible region 51aL based on the position of the user's eyes. Then, the controller 7 can determine a group of subpixels which are arranged in the predetermined number of columns and the predetermined number of rows and have the respective majority areas included in the left eye visible region 51aL to be the left eye subpixel group Pgl. The predetermined number of columns and the predetermined number of rows are two and three, respectively, in the example illustrated in FIG. 4. In this example, the controller 7 determines a group of the subpixels constituted of the subpixels P1 to P6 to be the left eye subpixel group Pgl.

The controller 7 can determine the right eye subpixel group Pgr based on the position of the user's eyes. In particular, the controller 7 can determine the right eye visible region 51aR based on the position of the user's eyes. Then, the controller 7 can determine a group of subpixels which are arranged in the predetermined number of columns and the predetermined number of rows and have the respective majority areas included in the right eye visible region 51aR to be the right eye subpixel group Pgr. In the example illustrated in FIG. 4, the controller 7 determines a group of the subpixels constituted of the subpixels P7 to P12 to be the right eye subpixel group Pgr.

The controller 7 may reduce the luminance of a number of binocular subpixels based on the illuminance Reducing the luminance may correspond to, for example, reducing the brightness to a predetermined brightness or lower. When the brightness is represented by values of 0 to 255, the predetermined brightness may be, for example, 10. Reducing the luminance may correspond to reducing the brightness to 0. Reducing the brightness of the subpixels to 0 may also be referred to as turning the subpixels off. In the drawings, the subpixels having reduced luminance are denoted by a reference sign "B".

In particular, the controller 7 determines each of the subpixels that has a portion included in the left eye visible region 51aL and the remaining portion included in the right eye visible region 51aR to be a binocular subpixel. The lower the level of obtained brightness, the more binocular subpixels the controller 7 may reduce the luminance of. For example, the lower the illuminance, the more binocular subpixels the controller 7 may reduce the luminance of. The controller 7 causes the subpixels that are included in the left eye subpixel group Pgl and not included in the binocular subpixels having reduced luminance to display the left eye image. The controller 7 causes the subpixels that are at least partially included in the right eye subpixel group Pgr and not included in the binocular subpixels having reduced luminance to display the right eye image.

For example, when the illuminance measured by the measuring apparatus 2 is at a first illuminance or higher, the controller 7 does not reduce the luminance of any binocular subpixels, as illustrated in FIG. 4. The first illuminance is the level of illuminance of the surrounding environment at which the user's eyes are unlikely see crosstalk caused when the user's left eye sees the right eye images displayed by the binocular subpixels and the user's right eye sees the left eye images displayed by the binocular subpixels. The first illuminance may be appropriately determined based on a barrier aperture ratio, the horizontal arrangement number n, or the like. The controller 7 may cause all of the subpixels constituting the left eye subpixel group Pgl to display the left eye image. The controller 7 may cause all of the subpixels constituting the right eye subpixel group Pgr to display the right eye image.

The controller 7 causes each of the subpixels P1 to P6 to display the left eye image, in the example illustrated in FIG. 4. The controller 7 causes each of the subpixels P7 to P12 to display the right eye image. In this case, the left eye can see the right eye image displayed by the subpixels P7 and P12. The right eye can see the left eye image displayed by the subpixels P1 and P6. Thus, crosstalk occurs. However, according to the characteristics of the human eye, crosstalk is more difficult to perceive as the illuminance of the surrounding environment is higher. Thus, by displaying the left eye image or the right eye image without reducing the luminance of the binocular subpixels by the controller 7, the user can appropriately see an image having a maintained resolution.

Figure 5:
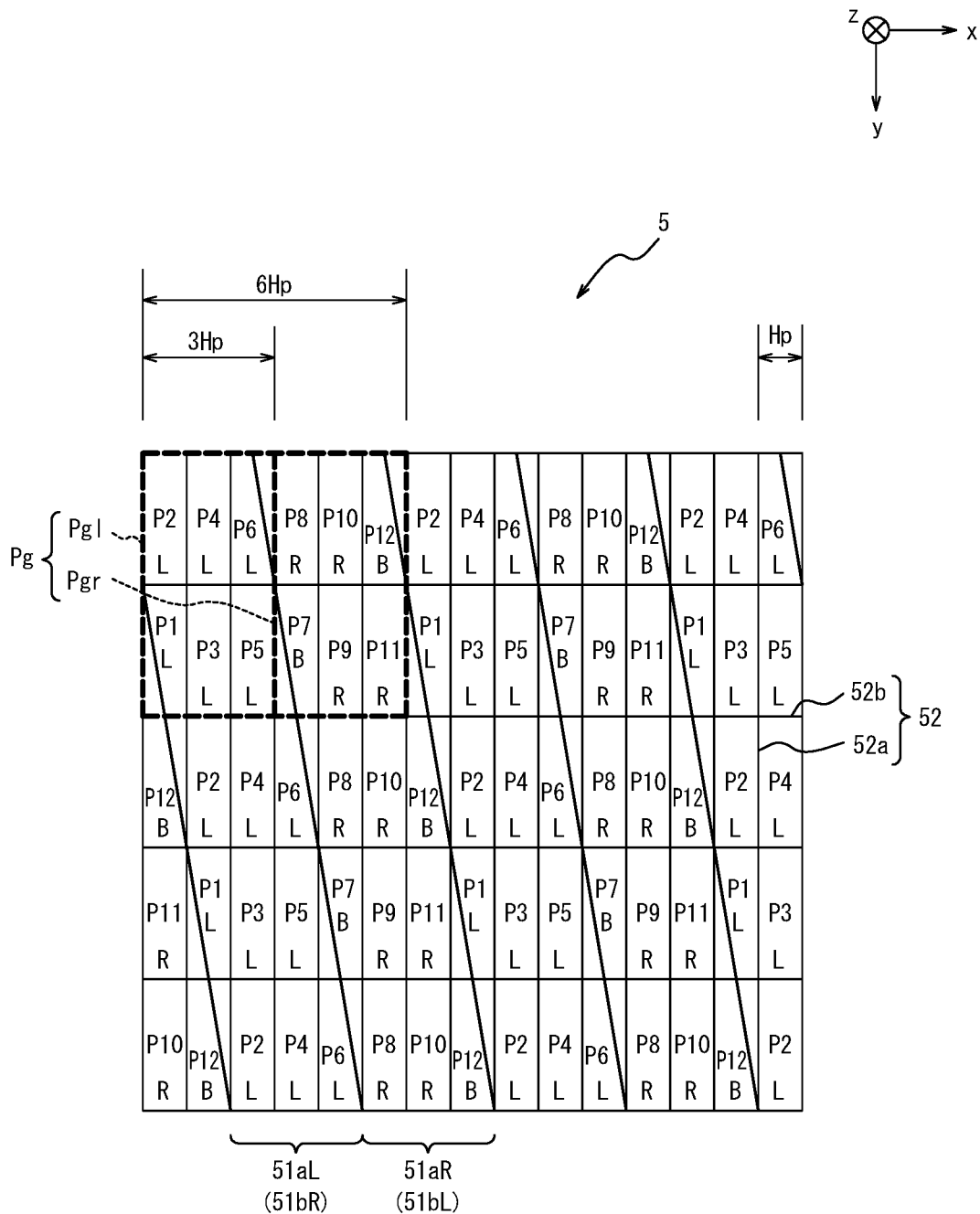
FIG. 5 is a schematic diagram for explaining an example image displayed by the display surface when the user's eyes are located at the reference position and the illuminance of the surrounding environment is less than the first threshold and equal to or greater than a second threshold.

In a case in which the illuminance measured by the measuring apparatus 2 is lower than the first illuminance and equal to or higher than a second illuminance, the controller 7 may reduce the luminance of a first predetermined number of binocular subpixels, as illustrated in FIG. 5. The second illuminance is an illuminance lower than the first illuminance. The first predetermined number is 1 or more. The first predetermined number is less than the total number of binocular subpixels.

For example, the controller 7 may reduce the luminance of the binocular subpixels constituting the right eye subpixel group Pgr. At this time, the controller 7 may cause all of the subpixels constituting the left eye subpixel group Pgl to display the left eye image. The controller 7 may cause the subpixels that are included in the right eye subpixel group Pgr and have the luminance which cannot be reduced to display the right eye image.

The controller 7 reduces the luminance of the subpixels P7 and P12, in the example illustrated in FIG. 5. The controller 7 causes each of the subpixels P1 to P6 to display the left eye image. The controller 7 causes each of the subpixels P8 to P11 to display the right eye image. As described, according to the characteristics of the human eye it is more difficult to perceive crosstalk as the illuminance of the surrounding environment is higher. Thus, by reducing the luminance of some binocular subpixels and causing other binocular subpixels to display the left eye image or the right eye image by the controller 7, the user can appropriately see an image in which crosstalk is suppressed.

Figure 6:
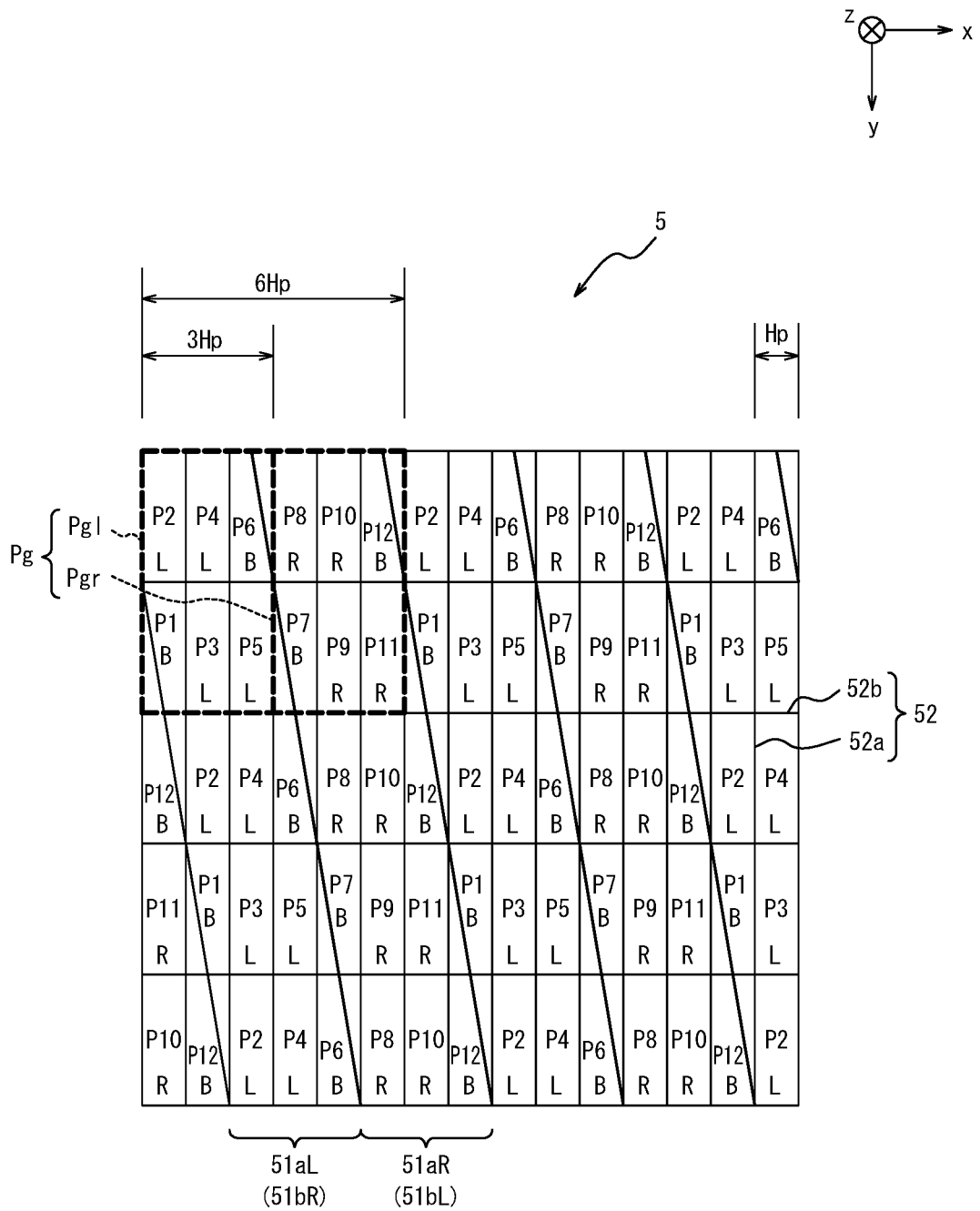
FIG. 6 is a schematic diagram for explaining an example image displayed by the display surface when the user's eyes are located at the reference position and the illuminance of the surrounding environment is less than the second threshold.

In a case in which the illuminance measured by the measuring apparatus 2 is lower than the second illuminance, the controller 7 may reduce the luminance of a second predetermined number of binocular subpixels, as illustrated in FIG. 6. The second predetermined number is equal to or more than the first predetermined number. The second predetermined number is equal to or less than the total number of the binocular subpixels. For example, the controller 7 may reduce the luminance of all of the binocular subpixels. At this time, the controller 7 may cause the subpixels that are included in the left eye subpixel group Pgl and have the luminance which cannot be reduced to display the left eye image. The controller 7 may cause the subpixels that are included in the right eye subpixel group Pgr and have the luminance which cannot be reduced to display the right eye image.

The controller 7 reduces the luminance of the subpixels P1, P6, P7, and P12, in the example illustrated in FIG. 6. The controller 7 causes each of the subpixels P2 to P5 to display the left eye image. The controller 7 causes each of the subpixels P8 to P11 to display the right eye image. As described, the characteristics of the human eye are such that it is more difficult to perceive crosstalk as the illuminance of the surrounding environment is higher. Thus, by reducing the luminance of all of the binocular subpixels by the controller 7, the user can appropriately see an image in which crosstalk is suppressed.

Second Example

An example in which the controller 7 causes each of the subpixels to display an image in a case in which the user's eyes are located at a displaced position displaced in the horizontal direction from the reference position by less than a distance E/n will be described in detail as a second example, with reference to FIG. 7 to FIG. 9.

Figure 7:
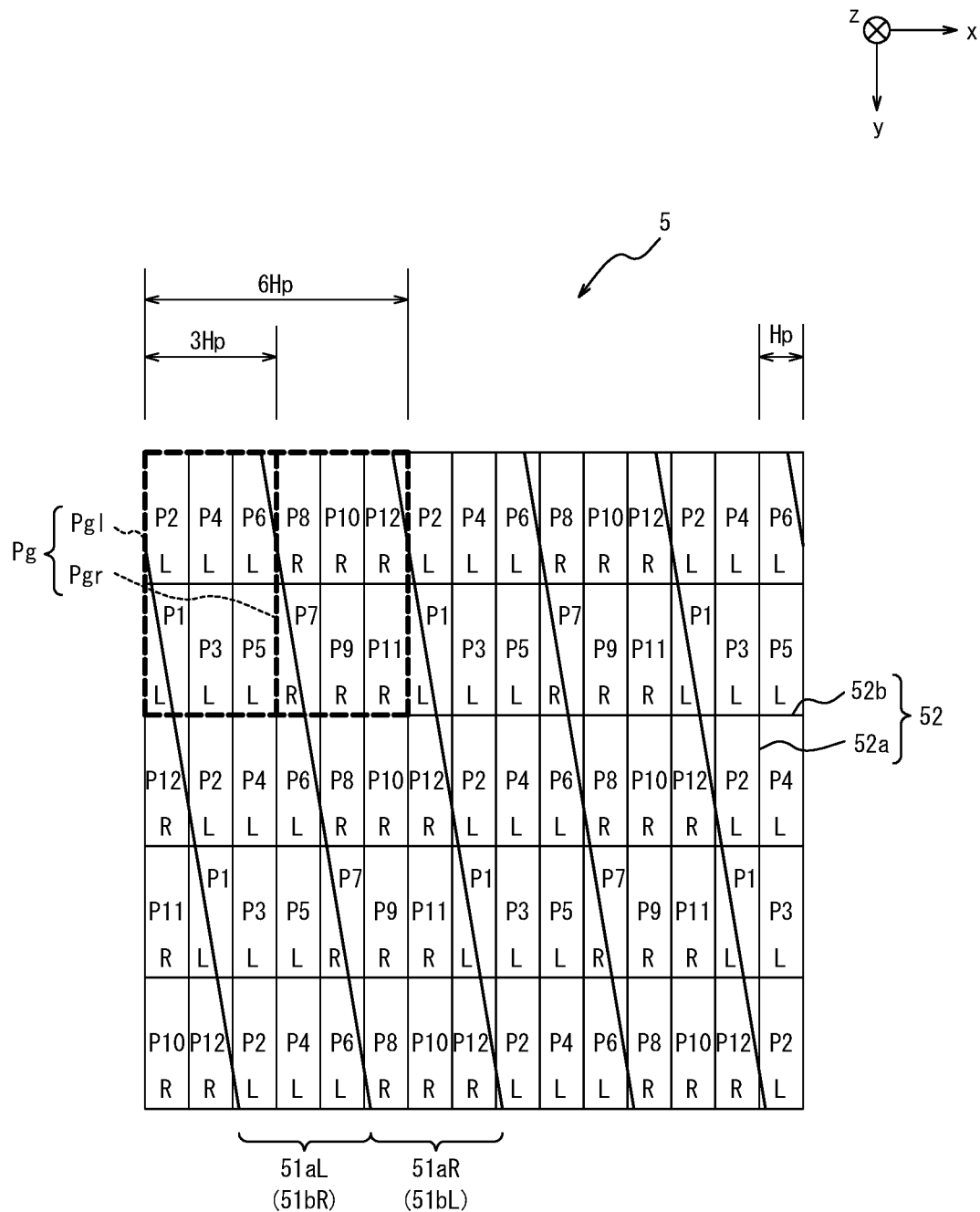
FIG. 7 is a schematic diagram for explaining an example image displayed by the display surface when the user's eyes are located at a displaced position and the illuminance of the surrounding environment is greater than the first threshold.

In a case in which the user's eyes are located at the displaced position, the straight line constituting the boundary between the left eye visible region 51aL and the right eye visible region 51aR does not pass through the intersection between the first black line 52a and the second black line 52b, as illustrated in FIG. 7.

The controller 7 may determine the left eye subpixel group Pgl and the right subpixel Pgr, in a manner similar to the first example. The controller 7 determines a group of subpixels constituted of the subpixels P1 to P6 to be the left eye subpixel group Pgl, in the example illustrated in FIG. 7. The controller 7 determines a group of subpixels constituted of the subpixels P7 to P12 to be the right eye subpixel group Pgr.

When the illuminance measured by the measuring apparatus 2 is equal to or higher than the first illuminance, the controller 7 does not reduce the luminance of any of the binocular subpixels, as illustrated in FIG. 7. The controller 7 may cause all of the subpixels constituting the left eye subpixel group Pgl to display the left eye image. The controller 7 may cause all of the subpixels constituting the right eye subpixel group Pgr to display the right eye image. The controller 7 causes each of the pixels P1 to P6 to display the left eye image in the example illustrated in HG 7. The controller 7 causes each of the pixels P7 to P12 to display the right eye image. Thus, when the illuminance is high (equal to or higher than the first illuminance), the user can appropriately see an image having maintained resolution while hardly perceiving crosstalk.

Figure 8:
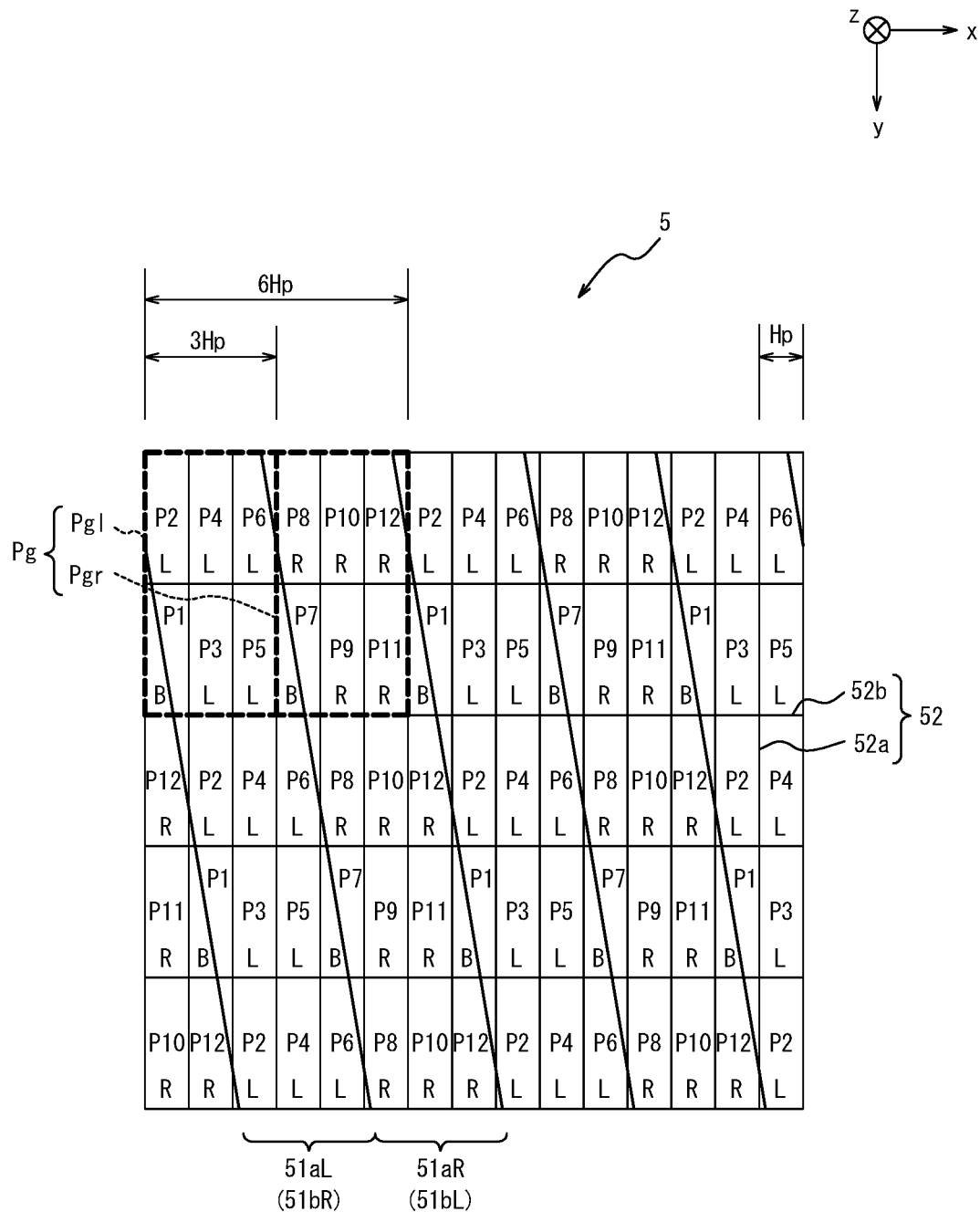
FIG. 8 is a schematic diagram for explaining an example image displayed by the display surface when the user's eyes are located at the displaced position and the illuminance of the surrounding environment is less than the first threshold and equal to or greater than the second threshold.

In a case in which the illuminance is lower than the first illuminance and equal to or higher than the second illuminance, the controller 7 may reduce the luminance of the binocular subpixel that is included in the left eye subpixel group Pgl and has a largest area included in the right eye visible region 51aR, as illustrated in FIG. 8. The controller 7 may reduce the luminance of the binocular subpixel that is included in the right eye subpixel group Pgr and has a largest area included in the left eye visible region 51aL. The controller 7 may cause subpixels that are included in the left eye subpixel group Pgl and have the luminance which cannot be reduced to display the left eye image. The controller 7 may cause the subpixels that are included in the right eye subpixel group Pgr and have the luminance which cannot be reduced to display the right eye image.

The controller 7 reduces the luminance of the subpixels P1 and P7 in the example illustrated in FIG. 8. At this time, the controller 7 causes each of the subpixels P2 to P6 to display the left eye image. The controller 7 causes each of the subpixels P8 to P12 to display the right eye image. Thus, in a case in which the illuminance is moderate (lower than the first illuminance and equal to or higher than the second illuminance), the user can appropriately see an image in which crosstalk and a decrease in resolution are suppressed.

Figure 9:
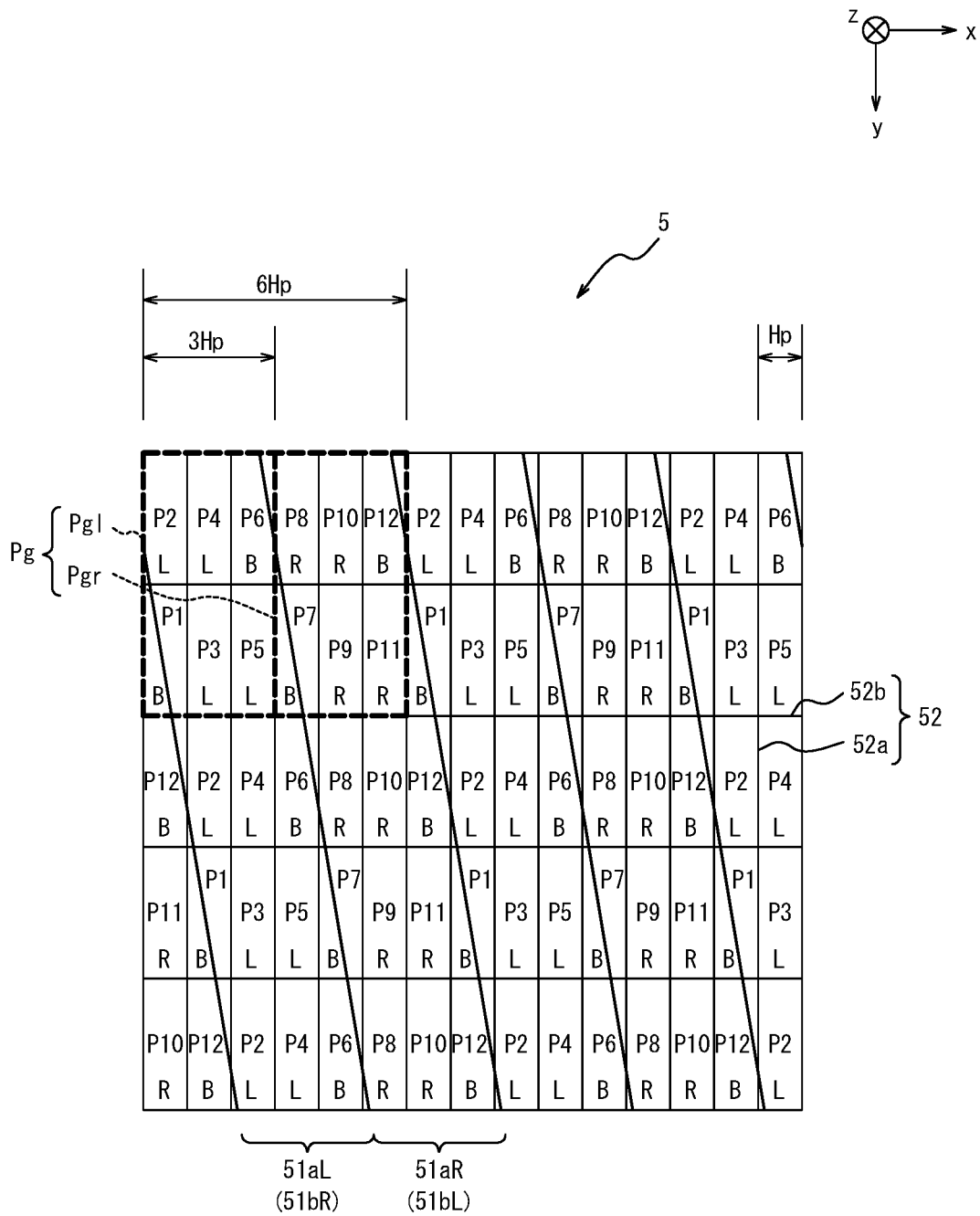
FIG. 9 is a schematic diagram for explaining an example image displayed by the display surface when the user's eyes are located at the displaced position and the illuminance of the surrounding environment is less than the second threshold.

In a case in which the illuminance measured by the measuring apparatus 2 is lower than the second illuminance, the controller 7 may reduce the luminance of the second predetermined number of binocular subpixels, as illustrated in FIG. 9. For example, the controller 7 may reduce the luminance of the binocular subpixels that are included in the left eye visible region 51aL and respectively have a largest area and a second largest area included in the right eye visible region 51aR. The controller 7 may reduce the luminance of the binocular subpixels that are included in the right eye visible region 51aR and respectively have a largest area and a second largest area included in the left eye visible region 51aL. At this time, the controller 7 may cause the subpixels that are included in the left eye subpixel group Pgl and have the luminance which cannot be reduced to display the left eye image. The controller 7 may cause the subpixels that are included in the right eye subpixel group Pgr and have the luminance which cannot be reduced to display the right eye image.

The controller 7 reduces the luminance of the subpixels P1, P6, P7, and P12, in the example illustrated in FIG. 9. The controller 7 causes each of the subpixels P2 to P5 to display the left eye image. The controller 7 causes each of the subpixels P8 to P11 to display the right eye image. Thus, in a case in which the luminance of the surrounding environment is low (lower than the second illuminance), the user can see an image in which crosstalk is suppressed.

Third Example

An example in which the controller 7 causes each of the subpixels to display an image when the eyes are located at the displaced position will be described in detail as a third example, with reference to FIG. 7, FIG. 10, and FIG. 11.

The controller 7 may determine the left eye subpixel group Pgl and the right eye subpixel group Pgr in a manner similar to the first example. In the example illustrated in FIG. 7, the controller 7 determines the group of subpixels constituted of the subpixels P1 to P6 to be the left eye subpixel group Pgl. The controller 7 determines the group of subpixels constituted of the subpixels P7 to P12 to be the right eye subpixel group Pgr.

In a case in which the illuminance measured by the measuring apparatus 2 is equal to or higher than the first illuminance, the controller 7 does not reduce the luminance of any of the subpixels, as illustrated in FIG. 7. The controller 7 may cause all of the subpixels constituting the left eye subpixel group Pgl to display the left eye image. The controller 7 may cause all of the subpixels constituting the right eye subpixel group Pgr to display the right eye image. The controller 7 causes the subpixels P1 to P6 to display the left eye image, in the example illustrated in FIG. 7. The controller 7 causes the subpixels P7 to P12 to display the right eye image.

Figure 10:
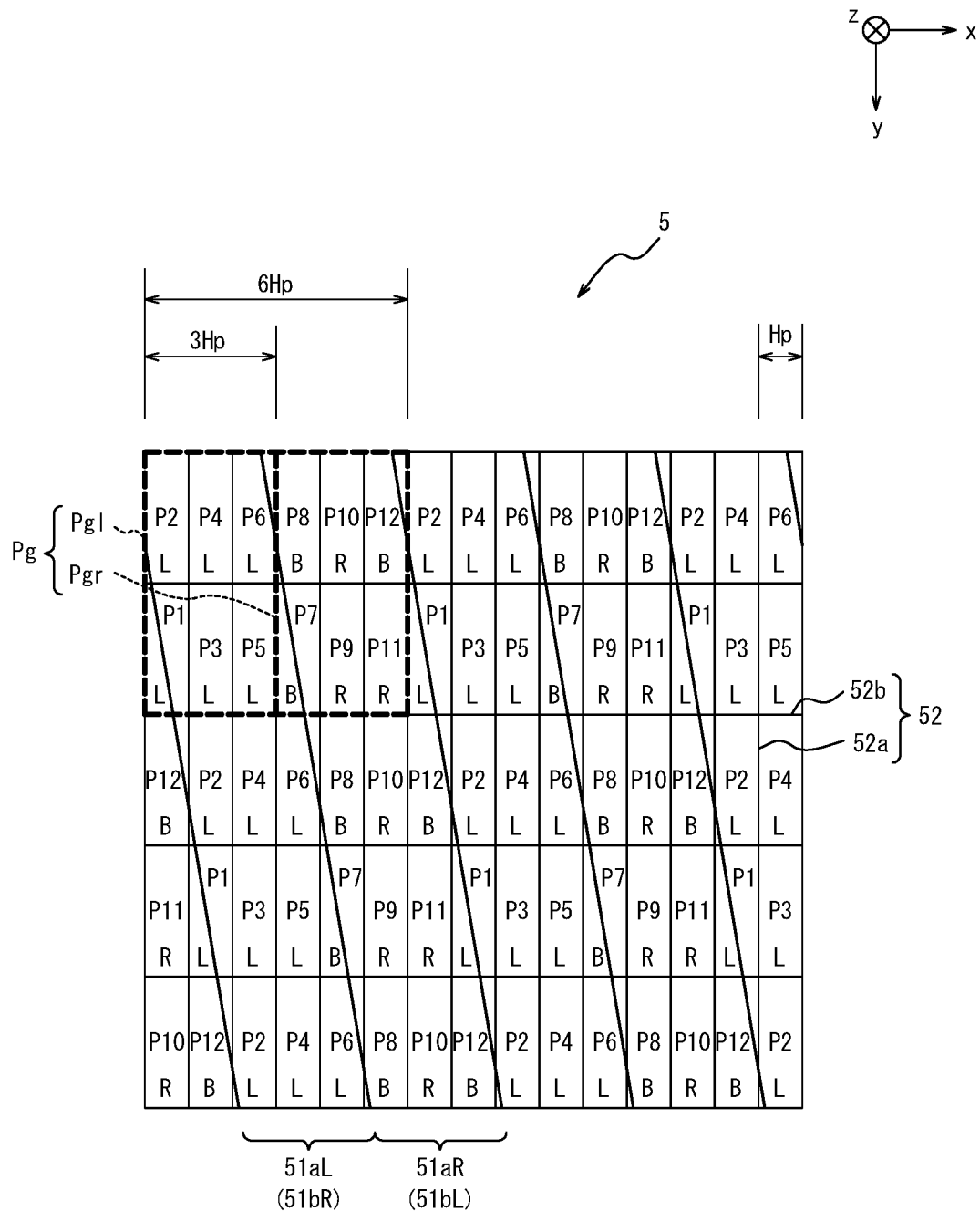
FIG. 10 is a schematic diagram for explaining an example image displayed by the display surface when the user's eyes are located at the displaced position and the illuminance of the surrounding environment is less than the first threshold and equal to or greater than the second threshold.

In a case in which the illuminance measured by the measuring apparatus 2 is lower than the first illuminance and equal to or higher than the second illuminance, which is lower than the first illuminance, the controller 7 may reduce the luminance of the binocular subpixels constituting the right eye subpixel group Pgr, as illustrated in FIG. 10. The controller 7 may cause all of the subpixels constituting the left eye subpixel group Pgl to display the left eye image. The controller 7 may cause the subpixels that are included in the right eye subpixel group Pgr and have the luminance which cannot be reduced to display the right eye image. The controller 7 reduces the luminance of the subpixels P7, P8, and P12, in the example illustrated in FIG. 10. At this time, the controller 7 causes the subpixels P1 to P6 to display the left eye image. The controller 7 causes the subpixels P9 to P11 to display the right eye image.

Figure 11:
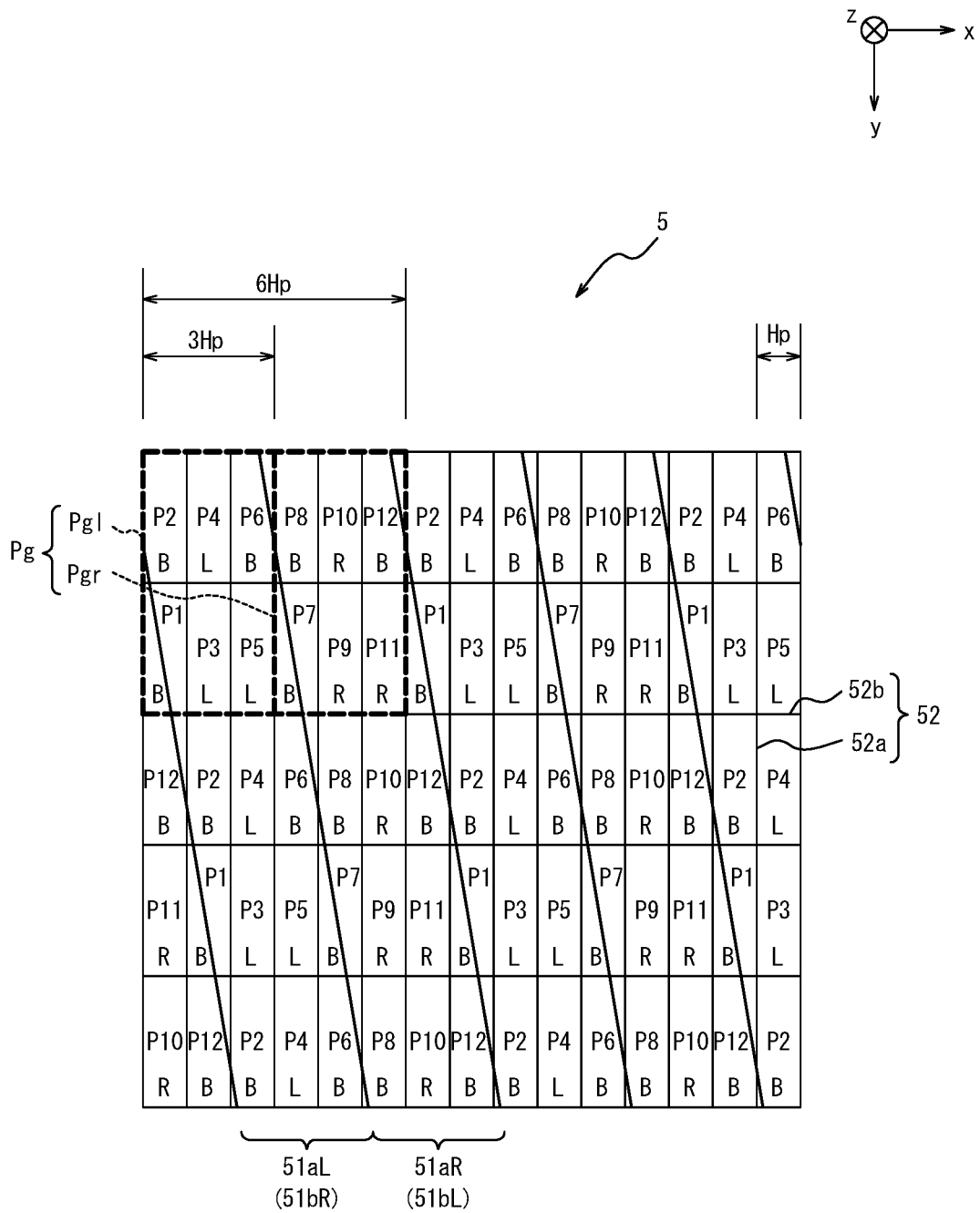
FIG. 11 is a schematic diagram for explaining another example image displayed by the display surface when the user's eyes are located at the displaced position and the illuminance of the surrounding environment is less than the second threshold.

In a case in which the illuminance measured by the measuring apparatus 2 is lower than the second illuminance, the controller 7 may reduce the luminance of all of the binocular subpixels, as illustrated in FIG. 11. At this time, the controller 7 may cause the subpixels that are included in the left eye subpixel group Pgl and have the luminance which cannot be reduced to display the left eye image. The controller 7 may cause the subpixels that are included in the right eye subpixel group Pgr and have the luminance which cannot be reduced to display the right eye image. The controller 7 reduces the luminance of the subpixels P1, P2, P6, P7, P8, and P12, in the example illustrated in FIG. 11. The controller 7 causes the subpixels P3 to P5 to display the left eye image. The controller 7 causes the subpixels P9 to P11 to display the right eye image.

Figure 12:
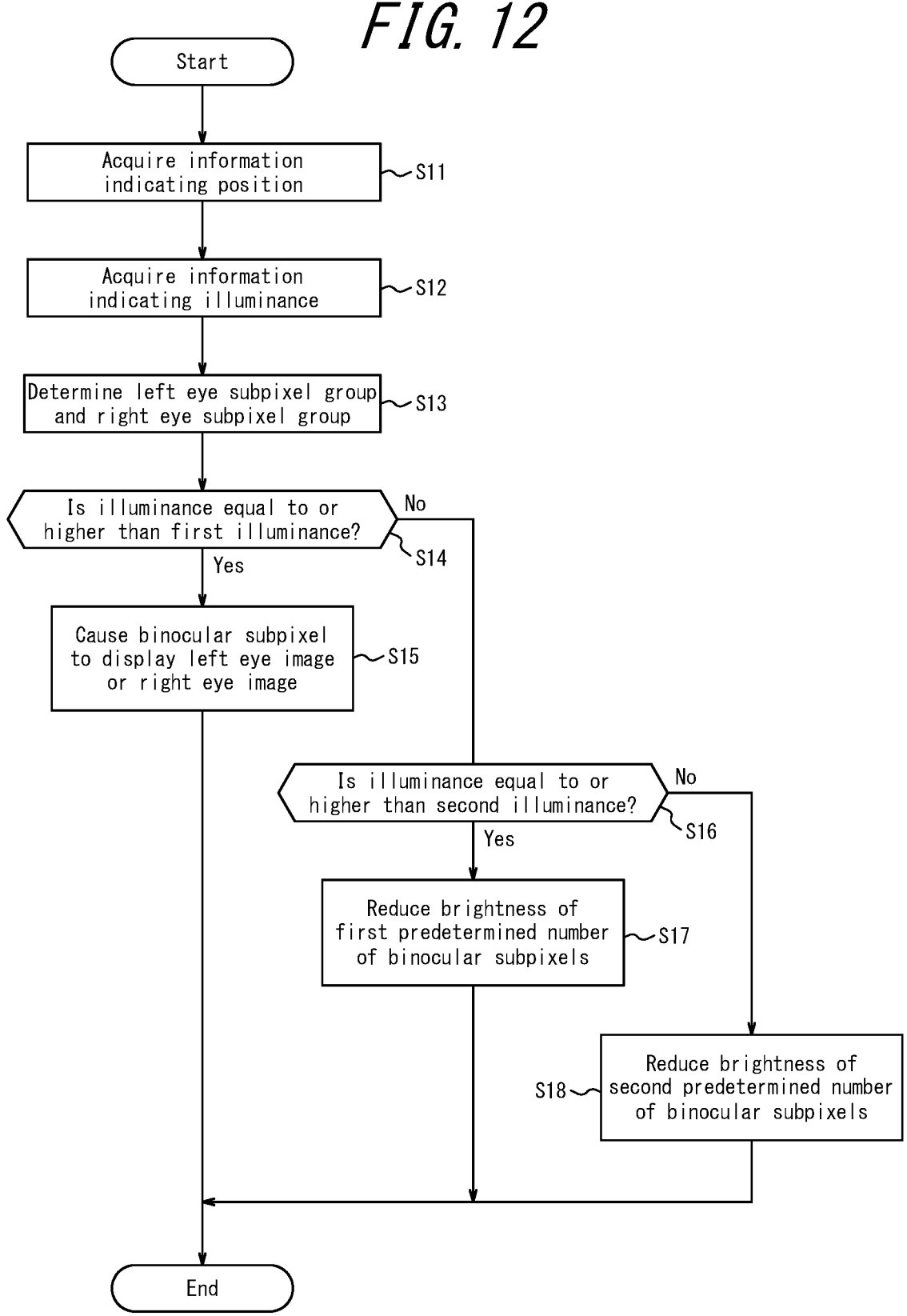
FIG. 12 is a flowchart illustrating an example operation flow of the three-dimensional display apparatus according to the first embodiment.

Next, an example operation performed by the three-dimensional display apparatus 3 of the first embodiment will be described with reference to FIG. 12.

The controller 7 acquires the information indicating the position of the user's eyes from the detection apparatus 1 (step S11).

After acquiring the information indicating the position of the user's eyes in step S11, the controller 7 acquires information indicating the illuminance of the surrounding environment from the measuring apparatus 2 (step S12).

After acquiring the information indicating the illuminance in step S12, the controller 7 determines the left eye subpixel group Pgl and the right eye subpixel group Pgr based on the position of the eyes according to the information acquired in step S11 (step S13).

After determining the left eye subpixel group Pgl and the right eye subpixel group Pgr in step S13, the controller 7 determines whether the illuminance according to the information acquired in step S12 is equal to or higher than the first illuminance (step S14).

When the controller determines that the illuminance is equal to or higher than the first illuminance in step S14, the controller 7 does not reduce the luminance of any of the binocular subpixels (step S15). In particular, the controller 7 causes each of the binocular subpixels to display the left eye image or the right eye image. At this time, the controller 7 causes all of the subpixels constituting the left eye subpixel group Pgl to display the left eye image. The controller 7 causes all of the subpixels constituting the right eye subpixel group Pgr to display the right eye image.

When the controller 7 determines that the illuminance is lower than the first illuminance in step S14, the controller 7 determines whether the illuminance is equal to or higher than the second illuminance (step S16).

When the controller 7 determines that the illuminance is equal to or higher than the second illuminance in step S16, the controller 7 reduces the luminance of the first predetermined number of binocular subpixels (step S17). At this time, the controller 7 causes the subpixels that are included in the left eye subpixel group Pgl and have the luminance which cannot be reduced to display the left eye image. The controller 7 causes the subpixels that are included in the right eye subpixel group Pgr and have the luminance which cannot be reduced to display the right eye image.

When the controller 7 determines that the illuminance is lower than the second illuminance in step S16, the controller 7 reduces the luminance of the second predetermined number of binocular subpixels (step S18). At this time, the controller 7 causes the subpixels that are included in the left eye subpixel group Pgl and have the luminance which cannot be reduced to display the left eye image. The controller 7 causes the subpixels that are included in the right eye subpixel group Pgr and have the luminance which cannot be reduced to display the right eye image.

According to the first embodiment, as described above, the controller 7 causes each of a plurality of subpixels to display an image based on the illuminance of the surrounding environment. The characteristics of the human eye are such that the sensitivity for perceiving crosstalk differs, depending on the illuminance of the surrounding environment. In particular, the characteristics of the human eyes are such that it is more difficult to perceive crosstalk as the illuminance of the surrounding environment is higher. Thus, when the illuminance of the surrounding environment is relatively high, the controller 7 does not reduce the luminance of the binocular subpixels and causes the binocular subpixels to display the left eye image or the right eye image. This enables the user to appropriately see an image in which the resolution is maintained in a state the user is unlikely to perceive crosstalk. The lower the illuminance of the surrounding environment, the easier the human eyes perceive crosstalk. Thus, for lower illuminance, the controller 7 reduces the luminance of more binocular subpixels. This enables the user to appropriately see an image in which crosstalk is suppressed. Thus, the user can appropriately see a three-dimensional image.

Second Embodiment

Hereinafter, a second embodiment of the present disclosure will be described with reference to the accompanying drawings.

Figure 13:
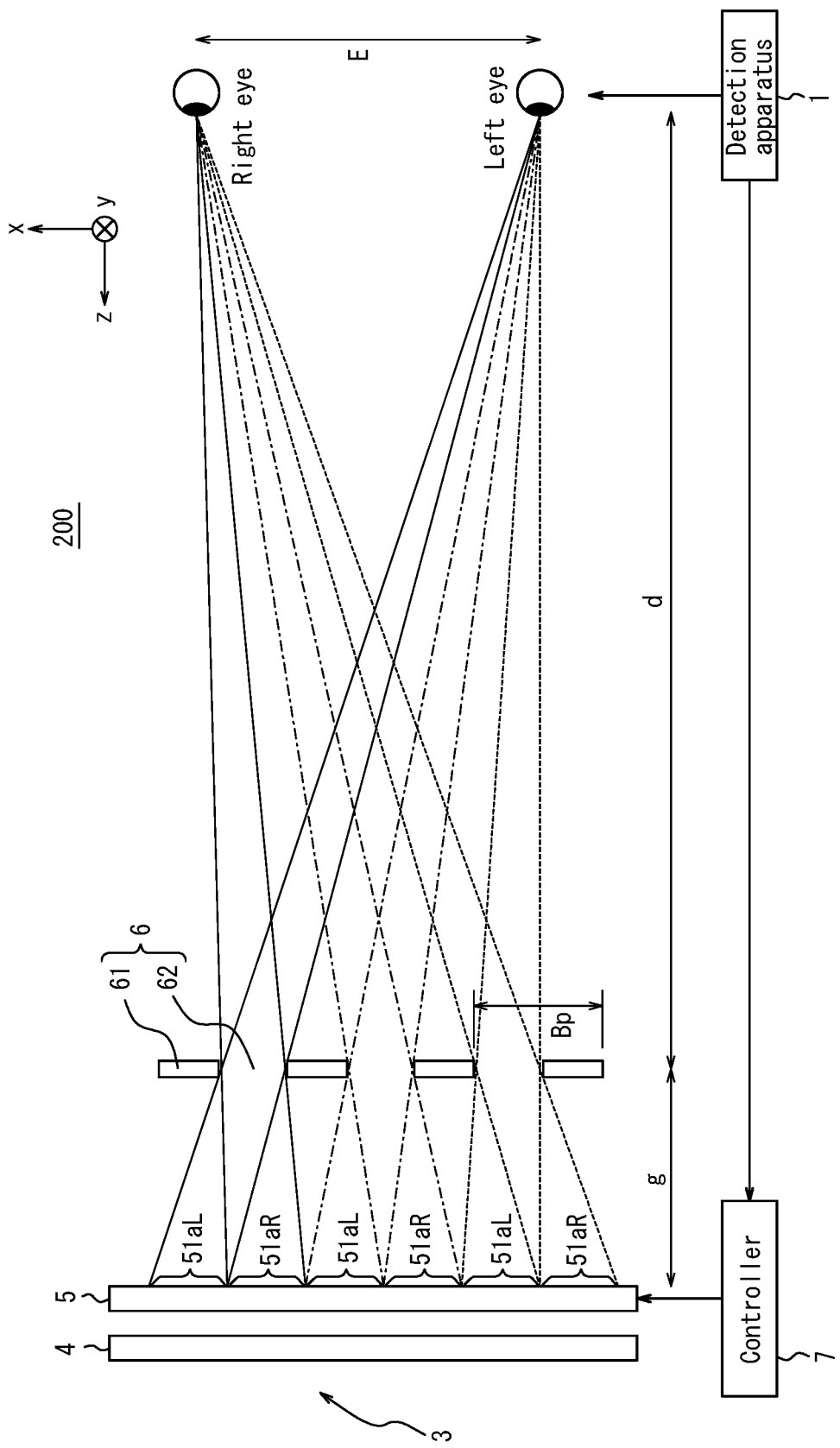
FIG. 13 is a diagram illustrating an example in which a three-dimensional display system according to a second embodiment is viewed in the vertical direction.

A three-dimensional display system 200 according to the second embodiment includes the detection apparatus 1 and the three-dimensional display apparatus 3 of the three-dimensional display system 100 according to the first embodiment, as illustrated in FIG. 13. The detection apparatus 1 and the three-dimensional display apparatus 3 may be configured in a manner similar to the detection apparatus 1 and the three-dimensional display apparatus 3, respectively, according to the first embodiment.

The controller 7 according to the second embodiment acquires the brightness information. For example, the controller 7 acquires image information acquired by the three-dimensional display apparatus 3 from an external apparatus regarding an image to be displayed by the display surface 51, or image information stored in a memory. The controller 7 acquires brightness information included in the image information. The brightness information may be information indicating brightness of an image. The information indicating brightness may be, for example, a statistical value of the brightness of the pixels constituting the image. The statistical value may be any statistical value such as, for example, a median value, a mean value, or the like.

In particular, in a case in which the brightness of the image is equal to or higher than a first brightness, the controller 7 does not reduce the luminance of any of the binocular subpixels. The controller 7 causes all of the subpixels constituting the left eye subpixel group Pgl to display the left eye image. The controller 7 causes all of the subpixels constituting the right eye subpixel group Pgr to display the right eye image. The first brightness is a value associated with the brightness of the image which is high to a degree at which the user's eyes are less likely to perceive crosstalk.

In a case in which the brightness of the image is lower than the first brightness and equal to or higher than a second brightness, the controller 7 reduces the luminance of the first predetermined number of binocular subpixels. The second brightness is brightness lower than the first brightness. The controller 7 causes the subpixels that are included in the left eye subpixel group Pgl and have the luminance which cannot be reduced to display the left eye image. The controller 7 causes the subpixels that are included in the right eye subpixel group Pgr and have the luminance which cannot be reduced to display the right eye image.

In a case in which the brightness of the image is lower than the second brightness, the controller 7 reduces the luminance of the second predetermined number of binocular subpixels. At this time, causes the subpixels that are included in the left eye subpixel group Pgl and have the luminance which cannot be reduced to display the left eye image. The controller 7 causes the subpixels that are included in the right eye subpixel group Pgr and have the luminance which cannot be reduced to display the right eye image.

In this case, the lower the brightness of the image, the more the luminance of the binocular subpixel is reduced. Thus, the entire image may become dark. As such, the controller 7 may reduce the luminance of the binocular subpixels and increase the brightness of the right eye image and the left eye image, in order to maintain the brightness of the entire image.

Other configurations and functions of the second embodiment are similar to those of the first embodiment. Thus, the same or corresponding constituent elements are denoted by the same reference signs, and descriptions thereof will be omitted.

As described above, the three-dimensional display apparatus 3 causes each of a plurality of subpixels to display an image based on the information indicating the brightness of the image to be displayed by each of the subpixels on the display surface 51, according to the second embodiment. In particular, the characteristics of the human eye are such that it is more difficult to perceive crosstalk as the brightness of the image displayed on the display surface 51 is higher. Accordingly, in a case in which the image has a relatively high brightness, the controller 7 does not reduce the luminance of the binocular subpixels and causes the left eye image or the right eye image to be displayed. Thus, the user can appropriately see an image in which the resolution is maintained in a state the user is unlikely to perceive crosstalk. The lower the brightness of an image displayed on the display surface 51, the easier the human eyes perceive crosstalk. Thus, as the brightness is lower, the controller 7 increases the number of binocular subpixels whose luminance is reduced. This enables the user to appropriately see the image in which crosstalk is suppressed. Accordingly, the user can appropriately see a three-dimensional image, and the same effect as the first embodiment can be obtained.

Although the above embodiments have been described as representative examples, it will be apparent to those skilled in the art that various modifications and substitutions can be made within the spirit and scope of the present disclosure.

Thus, the above embodiments should not be construed as limiting the present disclosure and may be varied or changed in a variety of manners without departing from the scope of the appended claims. For example, a plurality of constituent blocks descried in the embodiments may be combined into one constituent block, or one constituent block may be subdivided into a plurality of constituent blocks.

Although the controller 7 compares the illuminance acquired from the measuring apparatus 2 to the first illuminance and the second illuminance in the above embodiments, this is not restrictive. For example, the controller 7 may compare the illuminance to each of the first illuminance to an N-th (N is an integer) illuminance and, as the illuminance is higher, increase the number of binocular subpixels whose luminance is reduced.

In the first example and the third example of the present embodiment described above, when the illuminance is lower than the first illuminance and equal to or higher than the second illuminance, the controller 7 reduces the luminance of the binocular subpixels constituting the right eye subpixel group Pgr. However, the controller 7 may reduce the luminance of the binocular subpixels constituting the left eye subpixel group Pgl.

In the second example described above, when the illuminance is lower than the first illuminance and equal to or higher than the second illuminance, the controller 7 reduces the luminance of a binocular subpixel that is included in the left eye subpixel group Pgl and has a largest area included in the right eye visible region 51aR. However, the subpixel whose illuminance is reduced by the controller 7 is not limited thereto. For example, the controller 7 may reduce the luminance of the binocular subpixel that is included in the left eye subpixel group Pgl and has a smallest area included in the right eye visible region 51aR. In this case, although occurrence of crosstalk is not much suppressed, a decrease in the resolution is prevented. The subpixel whose luminance is reduced when the illuminance is lower than the first illuminance and equal to or higher than the second illuminance may be appropriately designed balancing the occurrence of crosstalk and a decrease in the resolution.

Figure 14:
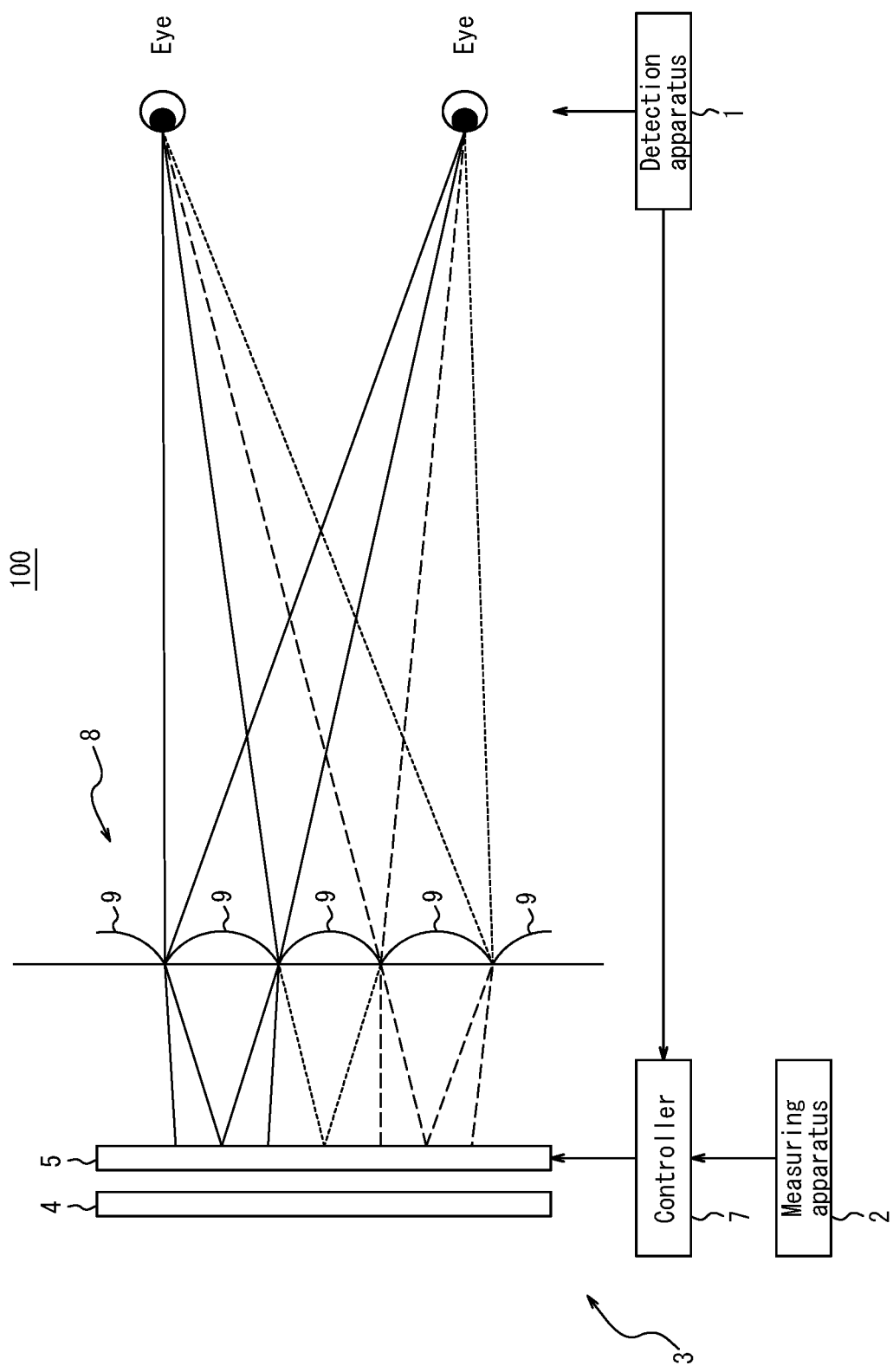
FIG. 14 is a schematic diagram illustrating a three-dimensional display apparatus that includes an optical element configured as a lenticular lens.

Although the optical element is configured as the parallax barrier 6 in the above embodiments, this is not restrictive. For example, the optical element included in the three-dimensional display apparatus 3 may be configured as a lenticular lens 8, as illustrated in FIG. 14. In this case, the lenticular lens 8 is formed by cylindrical lenses 9 arranged in the xy plane. In a manner similar to the parallax barrier 6, the lenticular lens 8 transmits image light emitted by some subpixels in the visible regions 51a to a position of the users left eye and image light emitted by other subpixels in the visible regions 51a to a position of the users right eye.

Figure 15:
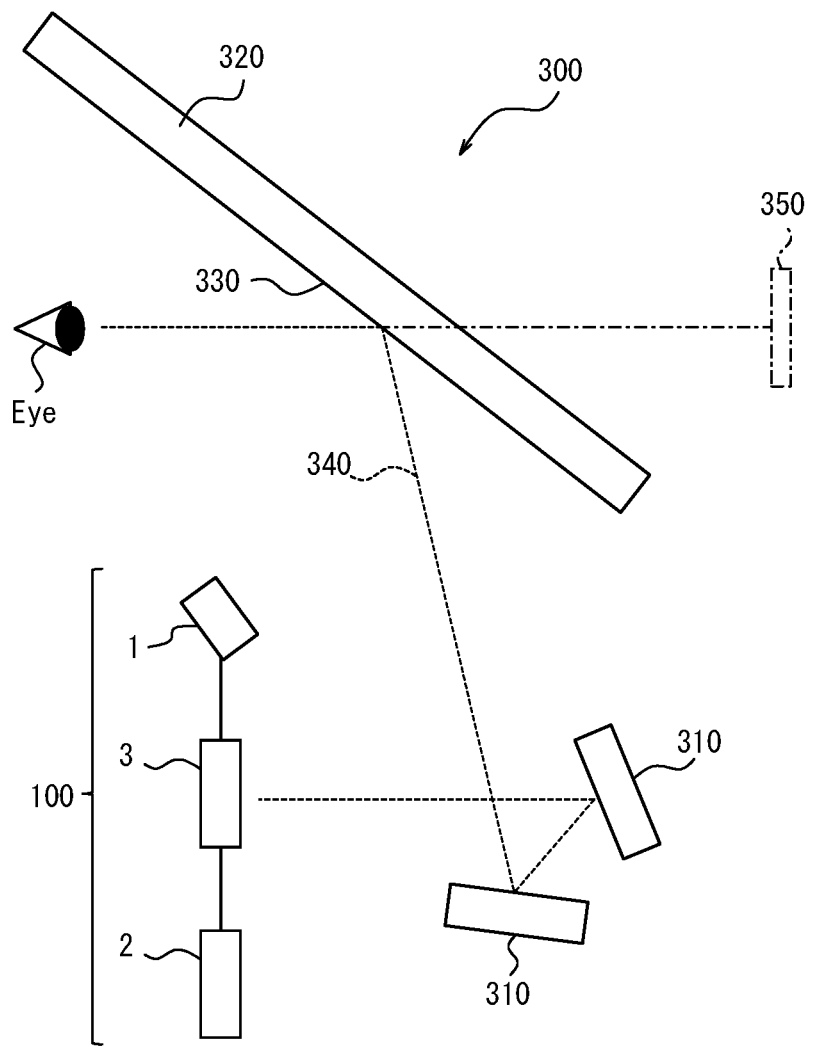
FIG. 15 is a diagram illustrating an example of a HUD having the three-dimensional display system according to the present disclosure mounted therein.

The three-dimensional display system 100 may be mounted in a head-up display system 300 as illustrated in FIG. 15. The head-up display system 300 may be also referred to as a HUD (Head-Up Display) 300. The HUD 300 includes the three-dimensional display system 100, an optical member 310, and a projection member 320 that includes a projection plane 330. The HUD 300 transmits image light emitted from the three-dimensional display system 100 to the projection member 320 via the optical member 310. The HUD 300 causes image light reflected by the projection member 320 to reach the users left and right eyes. That is, the HUD 300 causes image light from the three-dimensional display system 100 to proceed to the users left and right eyes along an optical path 340, which is indicated by a broken line. The user can perceive image light reached along the optical path 340 as a virtual image 350. The three-dimensional display system 100 can provide a stereoscopic image that follows user's movements, by controlling the display in accordance with the position of the users left and right eyes.

Figure 16:
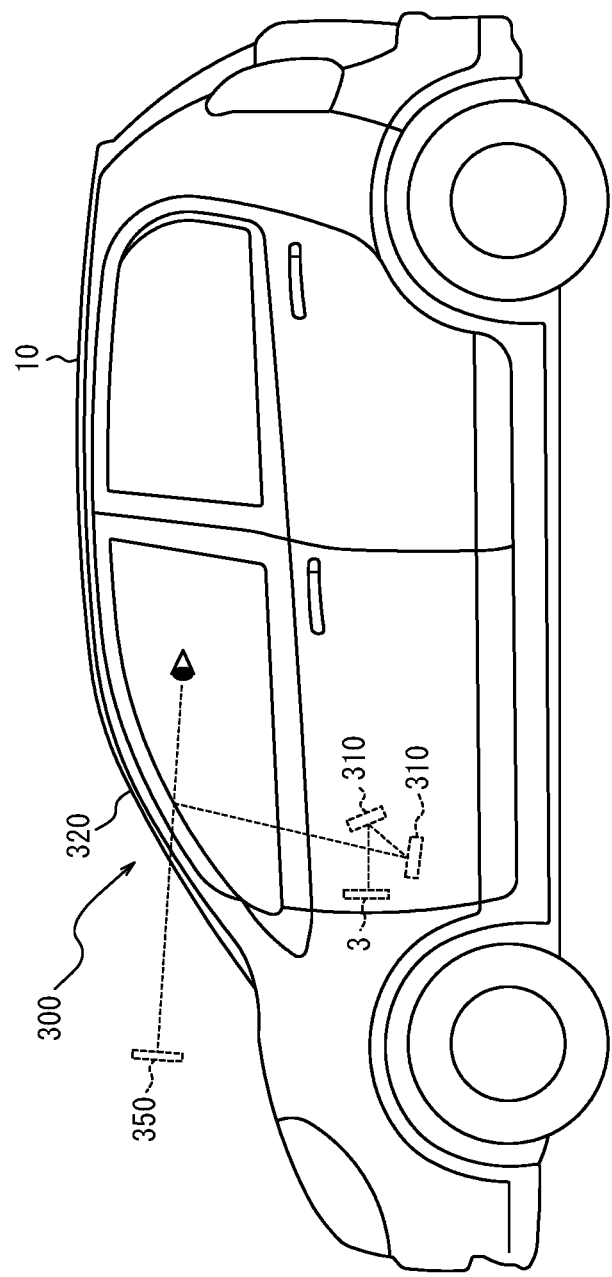
FIG. 16 is a diagram illustrating an example of a mobile body having the HUD illustrated in FIG. 15 mounted therein.

The HUD 300, the three-dimensional display system 100, and the three-dimensional display system 200 may be mounted in a mobile body 10, as illustrated in FIG. 16. Some constituent elements of each of the HUD 300, the three-dimensional display system 100, and the three-dimensional display system 200 may be shared by another apparatus or used as another constituent element of the mobile body 10. For example, the mobile body 10 may use the windshield also as a projection member 320. When some constituent elements are shared by another apparatus or used as another constituent element of the mobile body 10, another configuration may be referred to as a HUD module or a three-dimensional display component. The HUD 300, the three-dimensional display system 100, and the three-dimensional display system 200 may be mounted in the mobile body 10. The term "mobile body" used herein may encompass, for example, vehicles, ships, and aircrafts. Vehicles may include automobiles and industrial vehicles. Vehicles are not limited thereto but may include rail vehicles, domestic vehicles, and fixed-wing aircrafts that travel on a runway. Automobiles may include, for example, cars, trucks, buses, motorcycles, and trolley buses. Automobiles are not limited thereto but may include other automobiles that travels on the road. Industrial vehicles may include, for example, agricultural vehicles and construction vehicles. Industrial vehicles may include, for example, forklifts and golf carts. Industrial vehicles for agricultural purpose may include, for example, tractors, tillers, transplanters, binders, combined harvesters, and lawn mowers. Industrial vehicles for construction purposes may include, for example, bulldozers, scrapers, excavators, crane trucks, dump trucks, and load rollers. Vehicles may include human-power vehicles traveling on human power. Classification of the vehicles is not limited to the above. For example, vehicles may include industrial vehicles authorized to travel on the road, and a plurality of categories may include the same type of vehicle. Ships may include, for example, watercrafts, boats, and tankers. Aircraft may include, for example, fixed wing aircraft and rotorcraft.

The mobile body 10 may include an emitter for emitting light to the surroundings. The emitter is, for example, a headlight. In this case, the measuring apparatus 2 of the three-dimensional display system 100 of the HUD 300 mounted in the mobile body 10 may control the emitter based on the brightness measured by the measuring apparatus 2.

REFERENCE SIGNS LIST 1 detection apparatus
2 measuring apparatus
3 three-dimensional display apparatus
4 emitter
5 display panel
6 parallax barrier
7 controller
8 lenticular lens
9 cylindrical lens
10 mobile body
51 display surface
51aL left eye visible region
51aR right eye visible region
51bL left eye invisible region
51bR right eye invisible region 60 parallax barrier
61 light shielding surface
62 transmitting region
100, 200 three-dimensional display system
300 head-up display system
310 optical member
320 projection member
330 projection surface
340 optical path
350 virtual image

The invention claimed is:

1. A three-dimensional display apparatus comprising:
a display surface that includes a plurality of subpixels arranged in a grid pattern along a first direction corresponding to a direction in which user's eyes are aligned and a second direction orthogonal to the first direction,
an optical element that defines a beam direction of light emitted from the display surface for each of a plurality of strip-shaped regions extending in a direction on the display surface at a predetermined angle other than 0 degrees with respect to the second direction; and
a controller configured to cause the display surface to display an image, wherein
the controller is configured to acquire brightness information and, based on the brightness information, reduce the luminance of at least a subset of binocular subpixels that have a portion included in a first visible region on the display surface for emitting light to a first eye position of the user and a remaining portion included in a second visible region on the display surface for emitting light to a second eye position of the user, and
the controller is configured to reduce the luminance of more binocular pixels as the level of brightness becomes lower.

2. The three-dimensional display apparatus according to claim 1, wherein
the controller is configured to turn off the at least the subset of the binocular subpixels.

3. The three-dimensional display apparatus according to claim 1, wherein
the controller is configured to determine a first subpixel group that is at least partially included in the first visible region and constituted of subpixels in a predetermined number of columns and rows and a second subpixel group that is at least partially included in a second visible region and constituted of subpixels in a predetermined number of columns and rows, and cause a subpixel that is included in the first subpixel group and not included in binocular subpixels whose luminance is reduced to display a first image, and cause a subpixel that is included in the second subpixel group and not included in binocular subpixels whose luminance is reduced to display a second image.

4. The three-dimensional display apparatus according to claim 1, wherein
the controller is configured to acquire information indicating a position of the user's eyes and determine the binocular subpixels, the first visible region, and the second visible region based on the information indicating the position of the user's eyes.

5. The three-dimensional display apparatus according to claim 1, wherein
the controller is configured to acquire information indicating an illuminance of a surrounding environment as the brightness information and reduce the luminance of the binocular subpixels based on the illuminance.

6. The three-dimensional display apparatus according to claim 1, wherein
the controller is configured to acquire information indicating luminance of an image displayed on the display surface as the brightness information and reduce the luminance of the binocular subpixels based on the luminance of the image.

7. A three-dimensional display system comprising:
a measuring apparatus configured to measure brightness; and
a three-dimensional display apparatus that includes:
a display surface that includes a plurality of subpixels arranged in a grid pattern along a first direction corresponding to a direction in which user's eyes are aligned and a second direction orthogonal to the first direction,
an optical element that defines a beam direction of light emitted from the display surface for each of a plurality of strip-shaped regions extending in a direction on the display surface at a predetermined angle other than 0 degrees with respect to the second direction; and
a controller configured to cause the display surface to display an image, wherein
the controller is configured to acquire brightness information and, based on the brightness information, reduce the luminance of at least a subset of binocular subpixels that have a portion included in a first visible region on the display surface for emitting light to a first eye position of the user and a remaining portion included in a second visible region on the display surface for emitting light to a second eye position of the user, and
the controller is configured to reduce the luminance of more binocular pixels as the level of brightness becomes lower.

8. A mobile body provided with a three-dimensional display system comprising:
a measuring apparatus configured to measure brightness; and
a three-dimensional display apparatus that includes:
a display surface that includes a plurality of subpixels arranged in a grid pattern along a first direction corresponding to a direction in which user's eyes are aligned and a second direction orthogonal to the first direction,
an optical element that defines a beam direction of light emitted from the display surface for each of a plurality of strip-shaped regions extending in a direction on the display surface at a predetermined angle other than 0 degrees with respect to the second direction; and
a controller configured to cause the display surface to display an image, wherein
the controller is configured to acquire brightness information and, based on the brightness information, reduce the luminance of at least a subset of binocular subpixels that have a portion included in a first visible region on the display surface for emitting light to a first eye position of the user and a remaining portion included in a second visible region on the display surface for emitting light to a second eye position of the user, and
the controller is configured to reduce the luminance of more binocular pixels as the level of brightness becomes lower.

9. The mobile body according to claim 8, comprising:
an emitter that emits light to surroundings, wherein
the measuring apparatus controls the emitter based on the brightness.

10. A three-dimensional display method performed by a three-dimensional display apparatus that includes a display surface that includes a plurality of subpixels arranged in a grid pattern along a first direction in line with user's eyes and a second direction orthogonal to the first direction, an optical element that defines a beam direction of light emitted by the display surface for each of a plurality of strip-shaped regions that extends in a direction on the display surface at a predetermined angle other than 0 degrees with respect to the second direction, and a controller configured to cause the display surface to display an image, the three-dimensional display method comprising:

acquiring information indicating brightness;

based on the information indicating brightness, reducing the luminance of at least a subset of binocular subpixels that have a portion included in a first visible region on the display surface for emitting light to a first eye position of the user and a remaining portion included in a second visible region on the display surface for emitting light to a second eye position of the user; and reducing the luminance of more binocular pixels as the level of brightness becomes lower.

\* \* \* \* \*